US008226474B2

(12) United States Patent
Nguyen et al.

(10) Patent No.: US 8,226,474 B2
(45) Date of Patent: Jul. 24, 2012

(54) MOBILE GAMING DEVICES FOR USE IN A GAMING NETWORK HAVING GAMING AND NON-GAMING ZONES

(75) Inventors: Binh T. Nguyen, Reno, NV (US); Brian Underdahl, Reno, NV (US)

(73) Assignee: IGT, Reno, NV (US)

( * ) Notice: Subject to any disclaimer, the term of this patent is extended or adjusted under 35 U.S.C. 154(b) by 1330 days.

(21) Appl. No.: 11/518,342

(22) Filed: Sep. 8, 2006

(65) Prior Publication Data

US 2008/0076572 A1 Mar. 27, 2008

(51) Int. Cl.
*G06F 17/00* (2006.01)

(52) U.S. Cl. ........................................................ 463/29

(58) Field of Classification Search .............. 463/16–25, 463/29, 39–42
See application file for complete search history.

(56) References Cited

U.S. PATENT DOCUMENTS

| | | | |
|---|---|---|---|
| 4,335,809 | A | 6/1982 | Wain |
| 4,467,424 | A | 8/1984 | Hedges et al. |
| 4,614,342 | A | 9/1986 | Takashima |
| 4,624,462 | A | 11/1986 | Itkis |
| 4,764,666 | A | 8/1988 | Bergeron |
| 4,837,422 | A | 6/1989 | Dethloff et al. |
| 4,856,787 | A | 8/1989 | Itkis |
| 5,038,022 | A | 8/1991 | Lucero |
| 5,048,831 | A | 9/1991 | Sides |
| 5,054,787 | A | 10/1991 | Richardson |
| 5,069,453 | A | 12/1991 | Koza et al. |
| 5,112,050 | A | 5/1992 | Koza et al. |
| 5,129,652 | A | 7/1992 | Wilkinson |
| 5,178,389 | A | 1/1993 | Bentley et al. |
| 5,218,356 | A | 6/1993 | Knapp |
| 5,242,163 | A | 9/1993 | Fulton |
| 5,265,874 | A | 11/1993 | Dickinson et al. |
| 5,324,035 | A | 6/1994 | Morris et al. |
| 5,342,047 | A | 8/1994 | Heidel et al. |
| 5,382,784 | A | 1/1995 | Eberhardt |

(Continued)

FOREIGN PATENT DOCUMENTS

AT 184721 T 10/1999

(Continued)

OTHER PUBLICATIONS

Palmero, Vincent; "Near-filed magnetic comms energes"; Digital TV DesignLine.com.

(Continued)

*Primary Examiner* — Ronald Laneau
(74) *Attorney, Agent, or Firm* — Weaver Austin Villeneuve & Sampson LLP

(57) ABSTRACT

Novel gaming networks, devices, and systems for enabling game play on wireless, mobile gaming devices based on the location of the device are described. A mobile gaming device can be used for wagering game play when the device is physically present in an authorized game play zone in a gaming environment and is used by an authorized and verified user. A gaming environment is divided into zones wherein a zone either allows wagering game play on a device or does not. A zone has multiple transmitters that transmit security signals that are detectable by a mobile device at all times while the device is in the zone. An appropriate wireless communication standard can be used to transmit the security signal, such as near-field magnetic communication. The device has at least one user identification and authentication mechanism to ensure that only an authorized user is using the device.

34 Claims, 16 Drawing Sheets

U.S. PATENT DOCUMENTS

| | | | |
|---|---|---|---|
| 5,393,057 | A | 2/1995 | Marnell, II |
| 5,393,073 | A | 2/1995 | Best |
| 5,557,086 | A | 9/1996 | Schulze et al. |
| 5,618,045 | A | 4/1997 | Kagan et al. |
| 5,630,586 | A | 5/1997 | Lowden |
| 5,643,086 | A | 7/1997 | Alcorn et al. |
| 5,655,966 | A | 8/1997 | Werdin et al. |
| 5,678,886 | A | 10/1997 | Infanti |
| 5,709,603 | A | 1/1998 | Kaye |
| 5,738,583 | A | 4/1998 | Comas et al. |
| 5,741,183 | A | 4/1998 | Acres et al. |
| 5,761,647 | A | 6/1998 | Boushy |
| 5,762,552 | A | 6/1998 | Vuong et al. |
| 5,768,382 | A | 6/1998 | Schneier et al. |
| 5,770,533 | A | 6/1998 | Franchi |
| 5,779,545 | A | 7/1998 | Berg et al. |
| 5,779,546 | A | 7/1998 | Meissner et al. |
| 5,795,228 | A | 8/1998 | Trumbull et al. |
| 5,797,085 | A | 8/1998 | Beuk et al. |
| 5,810,664 | A | 9/1998 | Clapper, Jr. |
| 5,851,149 | A | 12/1998 | Xidos et al. |
| 5,871,398 | A | 2/1999 | Schneier et al. |
| 5,905,523 | A | 5/1999 | Woodfield et al. |
| 5,915,023 | A | 6/1999 | Bernstein |
| 5,951,397 | A | 9/1999 | Dickinson |
| 5,970,143 | A | 10/1999 | Schneier et al. |
| 5,999,808 | A | 12/1999 | LaDue |
| 6,001,016 | A | 12/1999 | Walker et al. |
| 6,012,832 | A | 1/2000 | Saunders et al. |
| 6,012,983 | A | 1/2000 | Walker et al. |
| 6,019,283 | A | 2/2000 | Lucero |
| 6,024,640 | A | 2/2000 | Walker et al. |
| 6,048,269 | A | 4/2000 | Burns et al. |
| 6,093,100 | A | 7/2000 | Singer et al. |
| 6,099,408 | A | 8/2000 | Schneier et al. |
| 6,104,815 | A | 8/2000 | Alcorn et al. |
| 6,105,008 | A | 8/2000 | Davis et al. |
| 6,106,396 | A | 8/2000 | Alcorn et al. |
| 6,110,041 | A | 8/2000 | Walker et al. |
| 6,113,495 | A | 9/2000 | Walker et al. |
| 6,117,013 | A | 9/2000 | Eiba |
| 6,135,887 | A | 10/2000 | Pease et al. |
| 6,149,522 | A | 11/2000 | Alcorn et al. |
| 6,178,510 | B1 | 1/2001 | O'Connor et al. |
| 6,234,896 | B1 | 5/2001 | Walker et al. |
| 6,264,559 | B1 | 7/2001 | Lawrence et al. |
| 6,264,561 | B1 | 7/2001 | Saffari et al. |
| 6,270,410 | B1 | 8/2001 | DeMar et al. |
| 6,280,326 | B1 | 8/2001 | Saunders |
| 6,285,868 | B1 | 9/2001 | LaDue |
| 6,308,887 | B1 | 10/2001 | Korman et al. |
| 6,319,122 | B1 | 11/2001 | Packes et al. |
| 6,340,331 | B1 | 1/2002 | Saunders et al. |
| 6,354,941 | B2 | 3/2002 | Miller et al. |
| 6,394,907 | B1 | 5/2002 | Rowe |
| 6,402,614 | B1 | 6/2002 | Schneier et al. |
| 6,409,602 | B1 | 6/2002 | Wilshire et al. |
| 6,416,414 | B1 | 7/2002 | Stadelmann |
| 6,424,819 | B1 | 7/2002 | Yan |
| 6,488,585 | B1 | 12/2002 | Wells et al. |
| 6,508,709 | B1 | 1/2003 | Karmarkar |
| 6,527,638 | B1 | 3/2003 | Walker et al. |
| 6,554,707 | B1 | 4/2003 | Sinclair et al. |
| 6,612,928 | B1 | 9/2003 | Bradford et al. |
| 6,628,939 | B2 | 9/2003 | Paulsen |
| 6,638,170 | B1 | 10/2003 | Crumby |
| 6,645,077 | B2 | 11/2003 | Rowe |
| 6,676,522 | B2 | 1/2004 | Rowe et al. |
| 6,682,421 | B1 | 1/2004 | Rowe et al. |
| 6,685,567 | B2 | 2/2004 | Cockerille et al. |
| 6,761,636 | B2 | 7/2004 | Chung et al. |
| 6,790,141 | B2 | 9/2004 | Muir |
| 6,800,029 | B2 | 10/2004 | Rowe et al. |
| 6,804,763 | B1 | 10/2004 | Stockdale et al. |
| 6,837,789 | B2 | 1/2005 | Garahi et al. |
| 6,843,725 | B2 | 1/2005 | Nelson |
| 6,846,238 | B2 | 1/2005 | Wells |
| 6,863,608 | B1 | 3/2005 | LeMay et al. |
| 6,918,831 | B2 | 7/2005 | Nguyen et al. |
| 6,942,570 | B2 | 9/2005 | Schneier et al. |
| 6,964,611 | B2 | 11/2005 | Packes, Jr. et al. |
| 6,971,956 | B2 | 12/2005 | Rowe et al. |
| 6,988,946 | B2 | 1/2006 | Michaelson et al. |
| 7,008,317 | B2 | 3/2006 | Cote et al. |
| 7,037,193 | B1 | 5/2006 | Kasparov et al. |
| 7,111,141 | B2 | 9/2006 | Nelson |
| 7,116,782 | B2 | 10/2006 | Jackson et al. |
| 7,384,339 | B2 | 6/2008 | LeMay et al. |
| 7,510,474 | B2 * | 3/2009 | Carter, Sr. ........................ 463/29 |
| 7,515,718 | B2 | 4/2009 | Nguyen et al. |
| 7,850,528 | B2 | 12/2010 | Wells |
| 7,918,728 | B2 | 4/2011 | Nguyen et al. |
| 2001/0003100 | A1 | 6/2001 | Yacenda |
| 2001/0039204 | A1 | 11/2001 | Tanskanen |
| 2001/0041612 | A1 | 11/2001 | Garahi et al. |
| 2002/0035538 | A1 | 3/2002 | Moreau |
| 2002/0035605 | A1 | 3/2002 | McDowell et al. |
| 2002/0042729 | A1 | 4/2002 | Yajima et al. |
| 2002/0060243 | A1 | 5/2002 | Janiak et al. |
| 2002/0066041 | A1 | 5/2002 | Lemke |
| 2002/0068629 | A1 | 6/2002 | Allen et al. |
| 2002/0069166 | A1 | 6/2002 | Moreau et al. |
| 2002/0085515 | A1 | 7/2002 | Jaynes et al. |
| 2002/0089410 | A1 | 7/2002 | Janiak et al. |
| 2002/0094860 | A1 | 7/2002 | Itkis et al. |
| 2002/0098883 | A1 | 7/2002 | Packes et al. |
| 2002/0098888 | A1 | 7/2002 | Rowe et al. |
| 2002/0103008 | A1 | 8/2002 | Rahn et al. |
| 2002/0111213 | A1 | 8/2002 | McEntee et al. |
| 2002/0115487 | A1 | 8/2002 | Wells |
| 2002/0119800 | A1 | 8/2002 | Jaggers et al. |
| 2002/0193099 | A1 | 12/2002 | Paulsen |
| 2003/0031321 | A1 | 2/2003 | Mages |
| 2003/0040354 | A1 | 2/2003 | Itkis et al. |
| 2003/0045341 | A1 | 3/2003 | Itkis et al. |
| 2003/0064805 | A1 | 4/2003 | Wells |
| 2003/0088880 | A1 | 5/2003 | Martinez et al. |
| 2003/0104865 | A1 | 6/2003 | Itkis et al. |
| 2003/0130029 | A1 | 7/2003 | Crumby |
| 2003/0130039 | A1 | 7/2003 | Nelson |
| 2003/0159044 | A1 | 8/2003 | Doyle et al. |
| 2003/0171986 | A1 | 9/2003 | Itkis et al. |
| 2003/0232647 | A1 | 12/2003 | Moser |
| 2004/0002385 | A1 | 1/2004 | Nguyen |
| 2004/0038723 | A1 | 2/2004 | Schneier et al. |
| 2004/0048667 | A1 | 3/2004 | Rowe |
| 2004/0053674 | A1 | 3/2004 | Nguyen et al. |
| 2004/0053692 | A1 | 3/2004 | Chatigny et al. |
| 2004/0137987 | A1 | 7/2004 | Nguyen et al. |
| 2004/0180718 | A1 | 9/2004 | Uchida et al. |
| 2004/0192439 | A1 | 9/2004 | Kula |
| 2004/0209690 | A1 | 10/2004 | Bruzzese et al. |
| 2004/0224741 | A1 | 11/2004 | Jen et al. |
| 2004/0230639 | A1 | 11/2004 | Soluk et al. |
| 2004/0235550 | A1 | 11/2004 | McNally et al. |
| 2004/0242321 | A1 | 12/2004 | Overton |
| 2005/0009600 | A1 | 1/2005 | Rowe et al. |
| 2005/0059485 | A1 | 3/2005 | Paulsen et al. |
| 2005/0097179 | A1 | 5/2005 | Orme |
| 2005/0101383 | A1 | 5/2005 | Wells |
| 2005/0107164 | A1 | 5/2005 | Muir et al. |
| 2005/0130728 | A1 | 6/2005 | Nguyen et al. |
| 2005/0143169 | A1 | 6/2005 | Nguyen et al. |
| 2005/0164783 | A1 | 7/2005 | Paulsen et al. |
| 2005/0181870 | A1 | 8/2005 | Nguyen et al. |
| 2005/0239530 | A1 | 10/2005 | Walker et al. |
| 2006/0009275 | A1 | 1/2006 | Packes et al. |
| 2006/0019745 | A1 | 1/2006 | Benbrahim |
| 2006/0035707 | A1 | 2/2006 | Nguyen et al. |
| 2006/0058102 | A1 | 3/2006 | Nguyen et al. |
| 2006/0068895 | A1 | 3/2006 | Nguyen et al. |
| 2006/0111168 | A1 | 5/2006 | Nguyen et al. |
| 2006/0211493 | A1 * | 9/2006 | Walker et al. .................... 463/29 |
| 2006/0281541 | A1 | 12/2006 | Nguyen et al. |
| 2007/0101039 | A1 | 5/2007 | Rutledge et al. |
| 2007/0207852 | A1 | 9/2007 | Nelson et al. |
| 2008/0026844 | A1 | 1/2008 | Wells |

| | | | | |
|---|---|---|---|---|
| 2008/0076547 | A1 | 3/2008 | Bigelow et al. | |
| 2008/0108426 | A1 * | 5/2008 | Nguyen et al. | 463/25 |
| 2008/0182667 | A1 | 7/2008 | Davis et al. | |
| 2008/0188308 | A1 | 8/2008 | Shepherd et al. | |
| 2008/0234047 | A1 * | 9/2008 | Nguyen | 463/42 |
| 2008/0298330 | A1 * | 12/2008 | Leitch | 370/338 |
| 2009/0170596 | A1 * | 7/2009 | Gagner et al. | 463/25 |
| 2009/0291755 | A1 * | 11/2009 | Walker et al. | 463/29 |

FOREIGN PATENT DOCUMENTS

| | | | |
|---|---|---|---|
| AU | 4664296 | A | 8/1996 |
| AU | 199871427 | | 4/1998 |
| AU | 199954012 | | 4/2000 |
| AU | 2001249901 | | 10/2001 |
| AU | 2001255746 | | 11/2001 |
| BR | 9606847 | A | 11/1997 |
| CA | 2 211 297 | A1 | 8/1996 |
| CA | 2 273 458 | | 1/2000 |
| CA | 2 302 548 | A1 | 5/2000 |
| CA | 2 211 297 | C | 8/2002 |
| CN | 1174620 | A | 2/1998 |
| CN | 1098510 | C | 1/2003 |
| CZ | 9702296 | A3 | 12/1997 |
| CZ | 294 347 | B6 | 12/2004 |
| DE | 195 02 613 | | 1/1996 |
| DE | 195 02 613 | A1 | 1/1996 |
| DE | 199 22 862 | A1 | 5/1999 |
| EP | 0 024 184 | A2 | 2/1981 |
| EP | 0 631 247 | A2 | 12/1994 |
| EP | 0 649 102 | A2 | 4/1995 |
| EP | 0 744 786 | A1 | 11/1996 |
| EP | 0 806 024 | A1 | 11/1997 |
| EP | 0 924 657 | A2 | 6/1999 |
| EP | 0 806 024 | B1 | 9/1999 |
| EP | 1 028 551 | A2 | 8/2000 |
| EP | 1 045 346 | A2 | 10/2000 |
| EP | 1 059 742 | A1 | 12/2000 |
| EP | 1 059 742 | A4 | 5/2001 |
| EP | 1 231 577 | | 8/2002 |
| FI | 973046 | A | 9/1997 |
| GB | 2 151 054 | A | 7/1985 |
| GB | 2 161 008 | | 1/1986 |
| GB | 2 161 629 | | 1/1986 |
| GB | 2 284 913 | A | 6/1995 |
| HU | 9800695 (A2) | | 7/1998 |
| JP | 10512984 (T) | | 12/1998 |
| JP | 2002-530006 | T | 9/2002 |
| NO | 973355 | A | 9/1997 |
| NO | 316247B | B1 | 12/2003 |
| PL | 321544 (A1) | | 12/1997 |
| RU | 2132569 | C1 | 6/1999 |
| RU | 2144264 | C1 | 1/2000 |
| RU | 2145116 | C1 | 1/2000 |
| RU | 2174258 | C2 | 9/2001 |
| SK | 101397 | A3 | 2/1998 |
| SK | 284750 | B6 | 11/2005 |
| WO | WO93/10508 | | 5/1993 |
| WO | WO95/24689 | | 9/1995 |
| WO | WO96/00950 | | 1/1996 |
| WO | WO96/23289 | A1 | 8/1996 |
| WO | WO98/58509 | | 12/1998 |
| WO | WO99/23594 | | 5/1999 |
| WO | WO99/34599 | | 7/1999 |
| WO | WO99/42964 | | 8/1999 |
| WO | WO99/51313 | | 10/1999 |
| WO | WO00/28680 | A1 | 5/2000 |
| WO | WO00/31982 | | 6/2000 |
| WO | WO-A-00/41428 | | 7/2000 |
| WO | WO-A-00/49731 | | 8/2000 |
| WO | WO00/67213 | | 11/2000 |
| WO | WO00/79467 | | 12/2000 |
| WO | WO01/00291 | A1 | 1/2001 |
| WO | WO01/01379 | A1 | 1/2001 |
| WO | WO01/03786 | | 1/2001 |
| WO | WO01/48712 | A1 | 7/2001 |
| WO | WO01/54091 | | 7/2001 |
| WO | WO01/74461 | | 10/2001 |
| WO | WO01/76710 | A2 | 10/2001 |
| WO | WO02/055163 | | 7/2002 |
| WO | WO02/101486 | | 12/2002 |
| WO | WO02/102483 | A1 | 12/2002 |
| WO | WO02/103550 | | 12/2002 |
| WO | WO03/005743 | | 1/2003 |
| WO | WO03/008057 | A1 | 1/2003 |
| WO | WO03/019486 | | 3/2003 |
| WO | WO03/027970 | | 4/2003 |
| WO | WO2005/031666 | A1 | 4/2005 |
| WO | WO2006/009791 | | 1/2006 |
| WO | WO 2006/085269 | | 8/2006 |
| WO | WO2006/138064 | | 12/2006 |
| WO | WO2008/030928 | | 3/2008 |

OTHER PUBLICATIONS

U.S. Appl. No. 12/208,074, filed Sep. 10, 2008, Mattice et al.

US Office Action dated Apr. 3, 2003 issued in U.S. Appl. No. 09/967,326.

US Office Action Final dated Oct. 20, 2003 issued in U.S. Appl. No. 09/967,326.

US Office Action (Advisory Action) dated Feb. 4, 2004 issued in U.S. Appl. No. 09/967,326.

US Office Action dated Feb. 25, 2004 issued in U.S. Appl. No. 09/967,326.

US Notice of Allowance dated Sep. 20, 2004 issued in U.S. Appl. No. 09/967,326.

US Office Action Dated Nov. 2, 2006 issued in U.S. Appl. No. 11/014,150.

US Notice of Allowance dated Feb. 8, 2007 issued in U.S. Appl. No. 11/014,150.

US Office Action dated Aug. 6, 2007 issued in U.S. Appl. No. 11/014,150.

US Office Action Final dated Mar. 26, 2008 issued in U.S. Appl. No. 11/014,150.

US Office Action (Examiner Interview Summary) dated Aug. 28, 2008 U.S. Appl. No. 11/014,150.

US Office Action Final dated Dec. 3, 2008 issued in U.S. Appl. No. 11/014,150.

US Office Action Final dated Jul. 30, 2009 issued in U.S. Appl. No. 11/014,150.

US Notice of Allowance dated Feb. 2, 2010 issued in U.S. Appl. No. 11/014,150.

US Office Action (Miscellaneous Communication to Applicant-No Action Count) dated Mar. 23, 2010 issued in U.S. Appl. No. 11/014,150.

US Notice of Allowance dated Jul. 8, 2010 issued in U.S. Appl. No. 11/014,150.

US Miscellaneous Communication dated Jul. 21, 2010 issued in U.S. Appl. No. 11/014,150.

US Miscellaneous Communication dated Sep. 9, 2010 issued in U.S. Appl. No. 11/014,150.

US Office Action dated Dec. 15, 2008 issued in U.S. Appl. No. 11/888,326.

US Office Action (Notice of Abandonment dated) Jun. 10, 2009 issued in U.S. Appl. No. 11/888,326.

US Office Action dated Jun. 27, 2008 issued in U.S. Appl. No. 10/871,876.

US Office Action Final dated Feb. 12, 2009 issued in U.S. Appl. No. 10/871,876.

US Office Action (Advisory Action) dated Apr. 27, 2007 issued in U.S. Appl. No. 10/871,876.

US Office Action dated Jul. 29, 2009 issued in U.S. Appl. No. 10/871,876.

US Office Action Final dated Jan. 20, 2010 issued in U.S. Appl. No. 10/871,876.

US Office Action dated Jul. 8, 2010 issued in U.S. Appl. No. 10/871,876.

US Office Action Final dated Jul. 31, 2002 issued in U.S. Appl. No. 09/882,558.

US Office Action Final dated Feb. 21, 2003 issued in U.S. Appl. No. 09/882,558.

US Notice of Allowance dated May 9, 2003 issued in U.S. Appl. No. 09/882,558.

US Office Action dated Feb. 15, 2006 issued in U.S. Appl. No. 10/672,307.
US Office Action (Examiner Interview Summary) dated Jun. 20, 2006 issued in U.S. Appl. No. 10/672,307.
US Office Action dated Sep. 21, 2006 issued in U.S. Appl. No. 10/672,307.
US Office Action dated May 8, 2007 issued in U.S. Appl. No. 10/672,307.
US Office Action Final dated Oct. 11, 2007 issued in U.S. Appl. No. 10/672,307.
US Office Action dated May 1, 2008 issued in U.S. Appl. No. 10/672,307.
US Office Action (Examiner Interview Summary) dated Nov. 19, 2008 issued in U.S. Appl. No. 10/672,307.
US Office Action (Examiner Interview Summary) dated Feb. 27, 2009 issued in U.S. Appl. No. 10/672,307.
US Notice of Allowance dated Jul. 6, 2009 issued in U.S. Appl. No. 10/672,307.
US Office Action (Miscellaneous Communication to Applicant-No Action Count) dated Jan. 5, 2010 issued in U.S. Appl. No. 10/672,307.
US Notice of Allowance dated Jan. 22, 2010 issued in U.S. Appl. No. 10/672,307.
US Notice of Allowance dated May 10, 2010 issued in U.S. Appl. No. 10/672,307.
US Miscellaneous Communication dated Jun. 15, 2010 issued in U.S. Appl. No. 10/672,307.
US Office Action dated Oct. 9, 2009 issued in U.S. Appl. No. 11/155,702.
US Office Action Final dated Jul. 14, 2010 issued in U.S. Appl. No. 11/155,702.
US Office Action dated Sep. 2, 2010 issued in U.S. Appl. No. 11/698,329.
US Office Action dated Aug. 22, 2002 issued in U.S. Appl. No. 09/882,559.
US Office Action dated Jan. 27, 2003 issued in U.S. Appl. No. 09/882,559.
US Notice of Allowance dated Jul. 16, 2003 issued in U.S. Appl. No. 09/882,559.
PCT International Search Report dated Sep. 23, 2003 issued in PCT/US02/31061.
PCT International Written Opinion dated Nov. 10, 2003 issued in PCT/US02/31061.
PCT International Preliminary Examination Report dated Jan. 19, 2004 issued in PCT/US02/31061.
AU Examiner's Report No. 1 dated Aug. 30, 2007 issued in AU Application No. 2002348579.
AU Examiner's Report No. 2 dated Sep. 22, 2008 issued in AU Application No. 2002348579.
AU Examiner's Report No. 3 dated Dec. 18, 2008 issued in AU Application No. 2002348579.
AU Examiner's Report No. 4 dated Mar. 30, 2009 issued in AU Application No. 2002348579.
CA Examination Report dated Sep. 7, 2010 issued in CA Application No. 2,461,881.
EP Examination Report dated Aug. 3, 2004 issued in EP Application No. 02 782 084.4.
EP Office Action dated Nov. 18, 2005 issued in EP Application No. 02 782 084.4 (9 pages).
EP Summons to Attend Oral Proceedings EP Office Action dated Nov. 24, 2006 issued in EP Application No. 02 782 084.4.
EP Result of Consultation Office Action dated Mar. 22, 2007 issued in EP Application No. 02 782 084.4.
EP Result of Consultation dated Jul. 5, 2007 issued in EP Application No. 02 782 084.4.
EP Extended Search Report dated Jun. 6, 2007 issued in EP Application No. 07 005 397.0.
EP Examination dated Nov. 7, 2007 issued in EP Application No. 07 005 397.0-2221.
EP Summons to Attend Oral Proceedings dated Apr. 14, 2008 issued in EP 07 005 397.0-2221.
EP Result of Consultation dated Jan. 28, 2009 issued in EP Application No. 07 005 397.0-2221.
EP Decision to Refuse a European patent application dated Mar. 3, 2009 issued in EP Application No. 07 005 397.0-2221.
EP Commencement of Proceedings before the Board of Appeal dated Jul. 30, 2009 issued in EP Application No. 07 005 397.0-2221.
EP Communication of the Registry dated Apr. 20, 2010 issued in EP Application No. 07 005 397.0-2221.
EP Communication of the Registry dated Jun. 24, 2010 issued in EP Application No. 07 005 397.0-2221.
EP Extended Search Report dated Jan. 30, 2008 issued in EP 07 015 979.3-2221.
EP Communication re Examination dated Jun. 6, 2008 issued in EP 07 015 979.3-2221.
EP Summons to Attend Oral Proceedings dated Apr. 30, 2009 issued in EP 07 015 979.3-2221.
RU Office Action dated Sep. 12, 2006 issued in RU Application No. 2004/109515/09 (010378).
RU Office Action dated Feb. 8, 2007 issued in RU Application No. 2004/109515/09.
PCT International Search Report dated Sep. 19, 2005 issued in PCT/US2005/021350.
PCT International Preliminary Report on Patentability and Written Opinion dated Sep. 18, 2005 issued in PCT/US2005/021350.
PCT International Preliminary Examination Report dated Sep. 11, 2003 issued in PCT/US2002/18861.
PCT International Search Report dated Oct. 29, 2002 issued in PCT/US02/188861.
PCT Written Opinion dated Apr. 8, 2003 issued in PCT/US02/18661.
AU Examiner's First Report dated Mar. 9, 2006 issued in AU Application No. 2002347362.
CA Office Action dated Jun. 4, 2007 issued in CA Application No. 2,454,581.
CA Office Action dated Sep. 5, 2008 issued in CA Application No. 2,454,581.
CA Office Action dated Sep. 3, 2008 issued in CA Application No. 2,454,581.
CA Office Action dated Oct, 29. 2010 issued in CA Application No. 2,454,581.
EP Supplementary Search Report dated Dec. 4, 2008 issued in EP 02 752 049.3-2221.
RU Advisory Office Action dated May 26, 2006 issued in RU Application No. 2003136277/09 (039251).
Ru Advisory Office Action dated Sep. 19, 2006 issued in RU Application No. 2003136277/09 (039251).
RU Grant of Patent dated Apr. 9, 2007 issued in RU Application No. 2003136277/09 (039251).
PCT International Search Report dated Jan. 19, 2005 issued in PCT/US2004/031315.
PCT International Preliminary Report on Patentability and Written Opinion dated Jan. 17, 2005 issued in PCT/US2004/031315.
AU Examiner's First Report dated Sep. 7, 2009 issued in AU Application No. 2004277242.
AU Examiner's report No. 2 dated Sep. 7, 2010 issued in AU Application No. 2004277242.
CN First Office Action dated May 16, 2008 issued in 2004800276444.
CN Second Office Action dated Apr. 24, 2009 issued in 2004800276444.
CN Third Office Action dated Oct. 16, 2009 issued in 2004800276444.
CN Fourth Office Action dated May 28, 2010 issued in 2004800276444.
EP Examination Report dated Jul. 20, 2006 issued in EP Application No. 04 788 976.1-1238.
EP Summons to Attend Oral Proceedings dated Jan. 30, 2009 issued in EP 04 788 976.1.
EP Search Report dated Nov. 18, 2009 issued in EP 09 15 9225.3 (EP 2 083 402 A3).
EP Communication re Examination dated Jun. 16, 2010 issued in EP 09 15 9225.3 (EP 2 083 402 A3).
PCT International Search Report dated Sep. 29, 2006 issued in PCT/US2006/021230 (WO 2006/138064).

PCT International Preliminary Examination Report and Written Opinion dated Sep. 29, 2006 issued in PCT/US2006/021230 (WO 2006/138064).
CN First Office Action dated Oct. 16, 2009 issued in 200680021769.5.
EP Examination Report dated May 4, 2009 issued in EP 06 760 619.4-1238.
PCT International Preliminary Examination Report dated Aug. 22, 2003 issued in PCT/US02/18875 (WO02/103550).
PCT International Search Report dated Sep. 12, 2002 issued in PCT/US02/18875 (WO02/103550).
PCT Written Opinion dated Feb. 24, 2003 issued in PCT/US02/18875 (WO02/103550).
AU Examiner's First Report dated Mar. 23, 2007 issued in AU 2002322096.
AU Examiner's Second Report dated Oct. 23, 2007 issued in AU 2002322096.
AU Notice of Opposition dated Apr. 6, 2009 issued in AU 2002322096.
AU Statement of Grounds and Particulars dated Jul. 3, 2009 issued in AU 2002322096.
AU Notice Opposition has been Withdrawn dated Aug. 19, 2009 issued in AU 2002322096.
European Supplementary Search Report dated Dec. 4, 2008 issued in EP 02 756 187.7-2221.
European Examination Report dated Mar. 2, 2009 issued in EP 02 756 187.7-2221.
RU Advisory Office Action dated May. 31, 2006 issued in RU 2003136278/09 (039240).
RU Resolution on Granting dated Oct. 4, 2006 issued in RU 2003136278/09 (039240).
PCT International Search Report dated Mar. 13, 2008 issued in PCT/US2007/077714 (WO08/030928).
PCT International Preliminary Report on Patentability and Written Opinion dated Mar. 10, 2009 issued in PCT/US2007/077714 (WO08/030928).
EP Examination Report dated Jun. 24, 2009 issued in EP 07 841 947.0.
EP Examination Report dated Nov. 25. 2009 issued in EP 07 841 947.0.
Patent Abstracts of Japan vol. 2000, No. 22, Mar. 9, 2001 & JP 2001 146058 A (SATO CORP), May 29, 2001 abstract.
Anonymous: "EM5007W Multimedia Cassiopeia-Yellow", Casio.com, [Online], Aug. 2, 2001, XP002430868, Retrieved from the Internet: URL:http://web.archive.org/web/2001080165446/www.casio.com/personalpcs/product.cfm?section=19&product=1972> [retrieved on Apr. 24, 2007].
Anonymous: "E-125 Cassiopeia", Casio.com, [Online} XP002430869, Retrieved from the Internet: url:http://web.archive.org/web/20011004012420/www.casio.com/personalpcs/product.cfm?section=19&product=3553.
Artobolevsky, I.I. (1976) *Polytechnic dictionary,* Moscow, Soviet Encyclopedia, p. 426.
Author unknown, "Call My Agent", *Business Week,* Mar. 6, 2000, p. 105.
Author unknown, "Smart Cubicles" *Business Week,* Mar. 6, 2000, p. 110.
Author unknown, "The Tube" *Business Week* Mar. 6, 2000, p. 106.
Gigaset CL4 SIMpad SIEMENS.COM, description [Online] Jun. 25, 2001, XP002430870 Retrieved from Internet: URL:http://web.archive.org/web/20010625204821/www.mysiemens.com/MySiemens/CDA/Standard/Frameset/0.1649.3_SIMPADCL4_0_0_61_0,FF.html (3 pages).
http://de.wikipedia.org/wiki/SIMpad (1 page, in German).
Internet/Intranet Information Appliance: Brilliant 15 Screen in Compact, Space saving Design, DT Research, Inc., www.dtresearch.com Oct. 2000, 2 pages.
Laptop.pdf as copied from Wikipedia (http://en.wikipedia.org/wiki/Laptop), 22 pages, [Retrieved from the Internet on Nov. 23, 2008].
Norenkov et al. (1998) "Telecommunication technologies and networks", Moscow, Publishing House of the Moscow State Technical University named after Bauman, 7:30.
Palm™ m 100 Specifications, www.palm.com [Retrieved from Internet on Sep. 6, 2006], 7 pages.
PCI Local Bus.pdf as redirected from Mini PCI from search on Wikipedia (http://en.wikipedia.org/wiki/MiniPCI), [Retrieved from Internet on Nov. 29, 2008], 15 pages.
"Mobile Gaming System Policies", State of Nevada wireless gaming regulations, http://gaming.nv.gov/documents/pdf/techpolicy_06may18.pdf, [Retrieved from Internet on Sep. 6, 2006], 5 pages.
The definition of graphical, *The American Heritage®* Dictionary of the English Language, *Third Edition,* copyright 1992 by Houghton Mifflin Company.
Wireless LAN.pdf as copied from Wikipedia (http://en.wikipedia.org/wiki/Wireless_LAN), [Retrieved from the Internet on Nov. 23, 2008], 12 pages.
Wireless network.pdf as copied from Wikipedia (http://en.wikipedia.org/wiki/wireless_network), [Retrieved from Internet on Sep. 24, 2009] 4 pages.
Wireless router.pdf as copied from Wikipedia (http://en.wikipedia.org/wiki/Wireless_router), [Retrieved from the Internet on Nov. 29, 2008], 3 pages.
US Office Action dated Dec. 23, 2010 issued in U.S. Appl. No. 10/871,876.
US Office Action Final dated Dec. 7, 2010 issued in U.S. Appl. No. 11/155,702.
US Office Action dated Apr. 6, 2011 issued in U.S. Appl. No. 11/155,702.
US Office Action Final dated Feb. 4, 2011 issued in 11/698,329.
CA Examination Report dated Jun. 13, 2011 issued in CA Application No. 2,461,881.
AU Examiner's 1st Report dated Oct. 11, 2010 issued in AU 2006259733.
AU Examiner's 2nd Report dated May 3, 2011 issued in AU 2006259733.
US Notice of Allowance dated Oct. 13, 2011 issued in U.S. Appl. No. 10/871,876.
US Notice of Allowance dated Sep. 12, 2011 issued in U.S. Appl. No. 11/155,702.
AU Examiner's first report dated Jun. 17, 2011 issued in AU Application No. 2009212922.
AU Examiner's report No. 2 dated Sep. 22, 2011 issued in AU Application No. 2009212922.
EP Summons to oral proceedings pursuant to Rule 115(1) EPC dated Aug. 8, 2011 issued in EP Application No. 07 005 397.0.
EP Examination Report dated Mar. 16, 2011 issued in EP 02 752 049.3-2221.
AU Examiner's first report dated Aug. 5, 2011 issued in AU 2007292255.
AU Examiner's report No. 2 dated Nov. 21, 2011 issued in AU 2007292255.

* cited by examiner

MOBILE GAMING SERVER 502

| USER/DEVICE DATABASE 504 | |
|---|---|
| USER ID 506 | DEVICE ID 508 |
| 4783 | x30a5 |
| 9206 | f72c9 |
| ⋮ | ⋮ |

| DEVICE/ZONE DATABASE 510 | |
|---|---|
| DEVICE ID 508 | ZONE ID 520 |
| x30a5 | A, C, D |
| f72c9 | B, E |
| ⋮ | ⋮ |

| ZONE/DATA DATABASE 512 | |
|---|---|
| ZONE ID 520 | DATA 518 |
| A | gaming and non-gaming data |
| B | gaming and non-gaming data |
| ⋮ | ⋮ |

DEVICE SPECIFIC DATA 514

FIG. 5A

MOBILE GAMING DEVICES FOR USE IN A GAMING NETWORK HAVING GAMING AND NON-GAMING ZONES

BACKGROUND OF THE INVENTION

1. Field of the Invention

The present invention relates to wagering game networks and gaming machines for playing games of chance. More specifically, it relates to managing and administering portable wagering game devices in a gaming environment having a gaming zone topology.

2. Description of the Related Art

Gaming is an increasingly popular industry, with casinos and other gaming establishments continually seeking new and exciting ways to present games of chance for play. Many wagering games are typically presented on large, free-standing or stand-alone gaming devices, such as electronic slot machines, video poker machines and the like. Some games of chance such as keno and bingo may be played in areas specially configured to present the game to players (e.g., at areas where personnel pick up keno cards and called numbers are displayed on large displays).

A substantial disadvantage to the way many wagering games are currently presented is that a player may participate in a particular game only at certain specified locations or on specific gaming machines or tables. For example, in order to play a specific video poker game, a player may have to walk through a large hotel or casino to a specific gaming area where the actual video poker gaming machine is located. The time taken by players to walk through casinos, hotels, and similar properties amounts to lost revenue to gaming operators since that time is not spent on game play or other casino or hotel services.

Thus, casinos and other gaming operators are always striving to provide their customers with greater accessibility to gaming devices and to the opportunity to play wagering games. Consequently, it is inevitable that hand-held, portable gaming devices will make their way into the wager gaming world, a concept that has been loosely referred to as "curb-to-curb" gaming. For example, U.S. Pat. No. 6,628,939 and patent application Ser. Nos. 10/672,307 and 10/871,876, address systems and methods for providing games of chance on a wireless game player, such as a hand-held Personal Gaming Device ("Personal Gaming Device"). Of course, added issues can arise whenever players are permitted to engage in wager gaming from mobile or remote locations, such as through the use of such a mobile gaming device. For example, security for any gaming operator-owned mobile gaming devices, increased fraud prevention, flexibility in mobile gaming device use, and player authentication and verification, are only a few examples of such issues.

In a recent move towards the use of mobile gaming devices, in 2005 the Nevada Gaming Control Board and its parent, the Gaming Commission, said they will allow mobile gaming (i.e., wager gaming through the use of mobile, wireless gaming devices) if operators can meet specific requirements. It will not be long before such devices for mobile gaming are seen in casinos and, more significantly, in other traditionally non-gaming areas. For example, regulations passed in Nevada in March 2006 (based on the 2005 legislation) allow mobile, hand-held devices for gambling in any public area of the state's casinos, such as restaurants and pool areas, shopping malls, nightclubs, and convention centers. This significant development in gaming regulations allows for better use of resort and hotel space, areas that have traditionally been used or are increasingly being used for non-gambling activities.

The Nevada regulations allow for a range of games of chance, including poker, blackjack, roulette, baccarat, slots, and horse-race betting to be played on mobile gaming devices if certain requirements are met. Two important and technically challenging requirements for mobile gaming will be 1) controlling how a portable gaming device is used (gaming vs. non-gaming services) based on the device's location; and 2) ensuring that only authorized users actually use the portable gaming device.

Although there is technology for monitoring the location of a portable device, such as radio frequency (RF) and global positioning systems (GPS), the equipment needed for deriving location is expensive and complex, and requires restrictions and controls. Furthermore, many gaming environments are not well suited for RF communication. Current access point triangulation, for example, requires sophisticated oscillators (that measure at the level of picoseconds because distances in a gaming environment can be very short) and other expensive equipment, and provides an exact location. However, measurements that provide such a high level of precision are generally not needed and, thus, the expense and complexity of access point triangulation may not be best suited for solving the problem of obtaining a close approximation of the location of a mobile gaming device that would meet the requirements of the new mobile gaming regulations.

Therefore, what is needed is a gaming network and wireless communication system that enables management of mobile gaming devices in a gaming network that has gaming and non-gaming areas and that meets mobile gaming regulations. Such a gaming network and communication system would facilitate determining a sufficiently accurate location of a portable gaming device in a property having gaming and non-gaming areas. Preferably, it would enable user and device authentication by determining whether an authorized and verified user is using an authorized and verified gaming device whenever the device is in use.

SUMMARY OF THE INVENTION

Novel gaming networks, mobile devices, and gaming systems are described for managing the operation and capabilities of mobile, wireless gaming devices in a gaming environment having zones that enable various degrees of functionality on a gaming device. In some aspects of the present invention, a user checks out and registers for a wireless gaming device, a portable, hand-held wireless device that the user can operate to play wagering games and access a variety of non-gaming services. The device is used in a gaming environment, such as a hotel or resort, which typically has a wide variety of public and private spaces or areas. According to gaming regulations in some jurisdictions, gaming on a mobile device is allowed only in certain areas. Therefore, in preferred embodiments of the invention, when the device is in a regulated area, the user can use the device for wagering game play. When the device is taken out of the regulated area, it can no longer be used for wagering game play but may be used for non-gaming services and/or for playing non-wagering games. Alternatively, the device will simply disable or shut down, preferably after saving the necessary game state data.

According to some implementations of the invention, areas or spaces of a gaming environment have underlying zones in a wireless gaming network. At a basic level, areas where mobile wager gaming is allowed, for example casino floors, nightclubs, and bars, have an underlying zone which has transmitters or antennas that transmit a security signal to the gaming device which allows the device to execute game play. As long as the device is in that zone it will hear the beacon or heartbeat from the transmitter and allow game play. If the device is taken to an area where wagering games are not allowed, for example, a video arcade, a hotel room, a family-style restaurant, the underlying zone may have transmitters that send a different type of heartbeat that tells the device that wagering game play is not allowed while other services are allowed, such as non-wager game play, concierge services, viewing restaurant menus and video entertainment, and the like. Or the area may not be part of any zone and thus may not have any transmitters (e.g., a sidewalk or street outside the gaming environment) so that there are no heartbeats or security signals being transmitted to the device and the device will shut down and not provide any services. The device can be taken from one area or zone to another in a gaming environment and adjust its capabilities accordingly without user intervention.

The security signal can be transmitted from an antenna or transceiver in a zone to a mobile gaming device using an appropriate wireless communication standard. One such standard is near-field magnetic communication, which has a high attenuation rate at distances in the range of 1.5 to 2 meters (5 to 6½ feet). In one implementation, a mobile device would need to hear a heartbeat at all times while in a zone thereby requiring that that the near-field magnetic transmitters or antennas be in close proximity of each other. Another standard that can be used is radio frequency transmission, such as the IEEE 802.11x or Bluetooth protocols. In this embodiment, a zone has RF transmitters at a sufficient density so that a mobile device will receive security signals to remain enabled. As long as the device is hearing a heartbeat, it knows it is in a particular zone and can receive and transmit wager gaming and non-gaming data using any appropriate wireless standard. An appropriate standard will take into consideration security of the data being transmitted and transmission speed, among other factors.

The mobile gaming device is preferably registered to an authorized user whose identity is verified at time of check out and registration by the gaming operator. Mobile gaming regulations will require that only the authorized user use the device. The primary concern here is that minors not be allowed to use the device. There are a number of biometric and other means that may be used for verifying that only the authorized user is handling the device, such as using a fingerprint scanner, voice recognition, image capture, a capacitive touch sensing device, and secondary identification and detection devices, such as RFID cards, tokens, and bracelets as well as identification and transaction certificates.

One aspect of the present invention is a mobile gaming network having one or more mobile wager gaming zones and one or more non-mobile wager gaming zones. The wager gaming zones have transmitters that transmit wireless signals that are detected by mobile gaming devices and enable the devices to play wagering games. The non-wager gaming zones also have transmitters that transmit wireless signals that are detected by the mobile gaming devices and enable the devices to access only non-gaming services and entertainment. The mobile gaming network also contains a mobile gaming server that stores data relating to the devices, the users, and to relationships among the devices, users, and various zones in the network.

In some embodiments the transmitters are near-field magnetic ("NFM") transmitters. In other embodiments they are radio frequency ("RF") transmitters. The mobile devices have a communication interface that is adapted to the wireless communication standard being used in the mobile network. In some embodiments a mobile gaming device has RF and NFM communication interfaces. In other embodiments the mobile gaming device contains a biometric device for verifying a user and may also contain a capacitive touch-sensing device for ensuring that only an authorized user uses the mobile gaming device. In other embodiments the mobile gaming server stores data in various data storage areas including a database for storing associations between a user identifier and a mobile gaming device identifier and another database for storing associations between a mobile gaming device identifier and one or more zones. In other embodiments the mobile gaming server also stores zone-specific data and mobile gaming device-specific data.

Another aspect of the present invention is a method of managing mobile wager gaming devices in a wireless network. A near-field magnetic ("NFM") security signal is transmitted from an NFM transmitter. The NFM signal is received at a mobile gaming device having a mobile ID, capable of executing wagering game software, and of detecting an NFM signal. The mobile gaming device maintains operability upon receiving the security signal and disables operability if it does not receive the security signal within a pre-determined time period. In this manner, operability of the mobile device is controlled based on a location of the mobile device in a gaming environment.

In some embodiments of the invention, radio frequency transmission is used to transmit wager gaming and non-gaming data between a mobile gaming device and the gaming network. In yet other embodiments, gaming and non-gaming data are exchanged between the mobile device and gaming network using NFM transmission. In other embodiments, a unique signature is assigned to the NFM security signal, wherein the unique signature corresponds to a specific mobile ID of the mobile device, and is received by the mobile device with the specific mobile ID that corresponds to the unique signature, thereby providing interactivity between a specific mobile device and a gaming server. In another embodiment, a unique signature that corresponds to a user is assigned to an NFM security signal and to a specific mobile device.

In other embodiments a mobile device is associated with a first zone in the wireless network, the first zone having a first set of NFM transmitters. A first set of gaming features is enabled on the mobile device when the mobile device is receiving NFM security signals in the first zone, wherein the first zone is a wager gaming zone. In other embodiments the mobile device contains an NFM signal receiver that is capable of detecting a security signal from the first set of NFM transmitters.

Another aspect of the invention is a wireless wager gaming network that includes multiple transmitters for transmitting a signal and multiple mobile gaming devices, a mobile gaming device capable of receiving a signal. The network has a first zone that has an associated set of functionality that allows for wager gaming on a mobile gaming device and a second zone that also has an associated set of functionality that allows for only non-gaming services on a gaming device.

Another aspect of the invention is a method of enabling wagering game execution on a mobile gaming device. A first zone signal is transmitted to and received by a mobile gaming device when the device is in a first zone. A second zone signal is transmitted to and received by a mobile gaming device when the device is in a second zone. Wagering game play is enabled on a mobile gaming device when the device is in the first zone and only non-gaming services are enabled when the device is in the second zone.

One aspect of the present invention is a wireless network for managing mobile devices where a device allows the play of wagering games by a user. The network includes multiple near-field magnetic transmitters, a gaming server, and multiple mobile devices, a mobile device having an NFM receiver and capable of executing wagering games, wherein the plurality of NFM transmitters emit NFM signals that are intended to be received by the plurality of mobile devices, whereby the presence of a specific mobile device within a pre-designated area can be determined.

In some embodiments of the invention, an NFM hub operates between the NFM transmitter and the gaming server for performing functions necessary for near field magnetic transmission, such as converting a NFM signals to appropriate formats for transmission to the various network devices. In another embodiment, a gaming device contains a NFM transmitter. In yet another embodiment, a gaming device has an RF transmitter.

Some embodiments of the present invention are computer-readable storage mediums, for example tangible computer program products such as CD-ROMs, that store computer code that can be executed on mobile gaming devices, mobile gaming servers, gaming machines, general-purpose computers, base stations and hubs, and various other computer and network devices. The computer code contains instructions for executing the method aspects of the present invention described above for implementing zone differentiation in a wireless gaming network and enabling game play and non-gaming services on a mobile gaming device.

The present invention provides hardware (such as gaming machines, gaming servers, network devices and so on) that is configured to perform the methods of the invention, as well as software to control devices to perform these and other methods.

These and other features of the present invention will be presented in more detail in the following detailed description of the invention and the associated figures.

BRIEF DESCRIPTION OF THE DRAWINGS

References are made to the accompanying drawings, which form a part of the description and in which are shown, by way of illustration, specific embodiments of the present invention:

FIG. 5A is a block diagram of a mobile gaming server in accordance with one embodiment of the present invention.

DETAILED DESCRIPTION OF THE INVENTION

Figure 1:
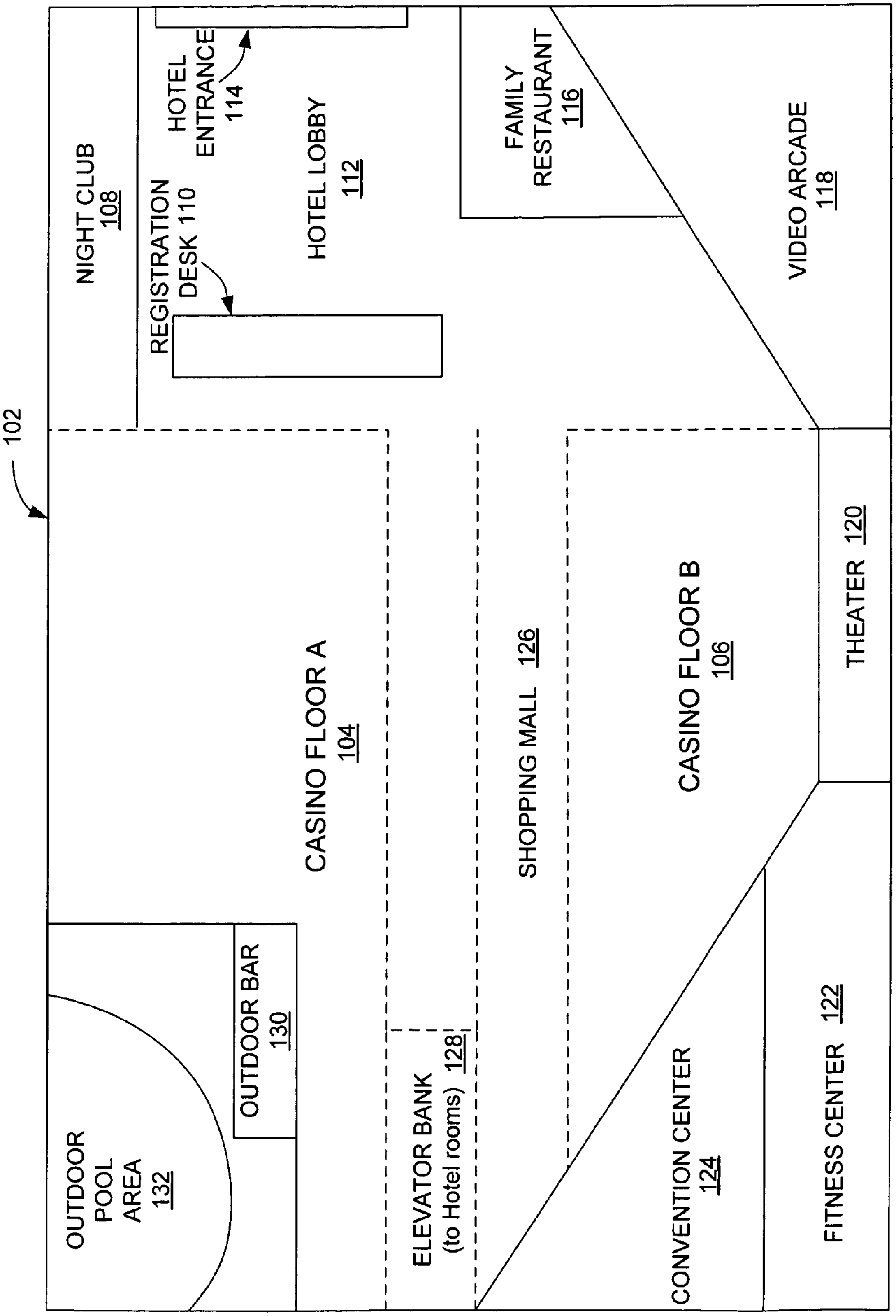
FIG. 1 is an exemplary top-view layout of a ground floor of a casino/hotel showing some typical public and private spaces.

Exemplary applications of networks, systems and methods according to the present invention are described. These examples are provided solely to add context and aid in the understanding of the invention. Thus, it will be apparent to one skilled in the art that the present invention may be practiced without some or all of the specific details described herein. In other instances, well-known process steps, system components, and software and network concepts have not been described in detail in order to avoid unnecessarily obscuring the present invention. Other applications are possible, such that the following examples, illustrations, and contexts should not be taken as definitive or limiting either in scope or setting. Although these embodiments are described in sufficient detail to enable one skilled in the art to practice the invention, these examples, illustrations, and contexts are not limiting, and other embodiments may be used and changes may be made without departing from the spirit and scope of the invention.

For example, although the present invention is directed primarily to gaming networks and mobile gaming devices, it is worth noting that some of the systems and methods disclosed herein might be adaptable for use in other types of networks and environments, such that their use is not restricted exclusively to the gaming context. In fact, it will be readily appreciated that a wide variety of wireless communication standards and devices can be used in conjunction with the inventive systems and methods disclosed herein. Such other devices can be specialized portable gaming devices that do not amount to actual gaming machines, for example, portable electronic gaming devices that act as "servers" in peer-to-peer gaming networks, as well as any other device that can be implemented with the inventive software and hardware architectures disclosed and detailed herein. Such other adaptations may become readily apparent upon review of the following detailed description. Although such other applications can be used with the inventive systems and methods disclosed herein, for purposes of clarity the discussion here shall focus on examples involving actual gaming machines and servers for purposes of clarity.

Mobile gaming networks, methods, and devices are described in the various figures. These networks and techniques enable determining the location of a mobile gaming device, determining whether an authorized user is using the device, and controlling the functionality of the mobile device based on the location of the device. A scenario in which the present invention could be used would include an eligible user registering for a mobile gaming device at a casino or other gaming environment. The device is wireless, portable, and can be held by a user much like a PDA, cell phone, tablet PC, or portable video game player. In some scenarios the device is associated with or tethered to the authorized user through use of a "virtual leash" described below. The user can play wagering games on the device if the device is in an eligible zone within a hotel or resort, as described in greater detail below. When a device is taken into a zone, the device detects its new location and its capabilities change accordingly. For example, if the user takes the device from a casino floor to a family restaurant, the wager gaming capabilities of the device may be disabled while non-wager gaming services can be maintained. If it is taken outside, where there is no network-enabled zone, the device is disabled and the gaming operator or a mobile gaming device administrator is notified. In another example, generally, a large area, such as a resort or a hotel utilizing the present invention will typically have numerous zones wherein the capability and functionality of the mobile gaming device depends on which zone the device is located.

As expected, numerous issues arise when an individual is able to use a portable, wireless gaming device to play wagering games. One concern is that the gaming device be used for playing wagering games only in certain areas or zones that fall within the descriptions of authorized gaming areas as defined by gaming regulations in the relevant jurisdiction. A second concern is that the device be used only by the authorized and authenticated user or users; that is, only by the eligible non-minors whose identities were verified when the device was registered and checked out. The present invention addresses these two issues as well as others with respect to the management and administration of mobile gaming devices in a gaming network. It also describes embodiments that enable controlling the capabilities of devices based on their locations in a mobile gaming network.

In a preferred embodiment of the present invention, a property, such as a hotel or resort that allows wager gaming, is divided into zoned and non-zoned segments. A zone is an area of the property that has one or more defining characteristics with respect to the play of wagering games. Generally, a zone can be fixed (permanent) or temporary, and the boundaries of a zone can be adjusted by a gaming operator or a mobile gaming device administrator. For the purposes of illustration, a basic defining characteristic of a zone is whether or not wager gaming is permitted within the zone. It is a simple binary-type feature: users can use the device to gamble in the zone or they cannot. There can be numerous variations of this basic scenario as desired by the gaming operator.

FIG. 1 is an exemplary top-view layout of a ground floor 102 of a casino/hotel showing some typical public and private spaces. Shown are a hotel entrance 114, lobby 112, a registration desk 110, a family-style restaurant 116, a nightclub 108, a video arcade 118, a theater 120, two casino floors A 104 and B 106, a shopping mall 126, an elevator bank 128 (to hotel rooms), a convention center 124, a fitness center 122, an outdoor pool area 132, and an outdoor bar 130. This list is not intended to be exhaustive; there can be many types of areas and public spaces in a typical gaming environment not shown in FIG. 1. Some of these areas are permanent or fixed wager gaming zones, such as casino floors A 104 and B 106, nightclub 108, outdoor bar 130, and so on, as permitted by gaming regulations. Other areas may be more suited for temporary gaming zones, such as convention center 124 and theater 120. Areas such as fitness center 122, outdoor pool area 132, and hotel lobby 112 can be areas where limited gaming capabilities are allowed. Finally, areas such as family restaurant 116, video arcade 118, hotel entrance 114, and elevator banks 128 are fixed non-gaming areas. Again, these are purely illustrative examples. The relevant gaming regulations will ultimately dictate which areas are game play areas and which are not. Of course, the underlying technical implementation will not be impeded or limited by the gaming regulations. Generally, it is expected that areas where minors and children are present or predominant, such as video arcades, family-style restaurants, and so on, will be non-gaming areas as mandated by mobile gaming regulations.

As described in greater detail below, each area has an underlying zone that is associated with a mobile gaming network. FIG. 1 is intended to introduce and illustrate that there can be numerous public and private spaces in a typical gaming environment in which the present invention is implemented and where mobile gaming device users, their children and other minors, can generally walk freely from one area to another with obvious restrictions for children and minors. The present invention enables a user to move about unencumbered holding a mobile gaming device, whereby the device will automatically be configured with a set of functions and capabilities by a gaming network based on the user's whereabouts. Thus, as an example, if a user is playing blackjack on a mobile gaming device while on casino floor B 106 and walks out to lobby 112, the blackjack game will be saved and the gaming functionality of the device is disabled while other non-gaming services remain. If the user keeps walking and enters video arcade 118, the device shuts down completely. In another example, suppose wager gaming on the portable device is allowed in hotel lobby 112. If the user is playing poker on the device and approaches hotel entrance 114 to go out or to elevator bank 128, presumably to got to a hotel room where mobile game play is not allowed, the game state is saved and the device automatically goes into a non-gaming services mode. In another example, a temporary gaming area is established in convention center 124 for a special event on a weekend and ends on Sunday night. During that weekend a user can play a game on the device while on casino floor B 106 and walk to convention center 124 and keep playing the game. However, if the user attempted this on Monday morning, the gaming functionality of the device would be disabled. As can be seen, in the zone-based, mobile gaming environment of the present invention there is a wide range of scenarios in which the functionality of a mobile gaming device can change based on where and when the device is being used and, as described below can change, based on who is using it.

Floor layout 102 as shown in FIG. 1 enables or disables mobile gaming device functionality based on an underlying mobile gaming network having zones. In a preferred embodiment, each area in which the mobile gaming device has some degree of functionality is implemented or has an underlying zone that is defined in a mobile gaming network. FIG. 2 is an illustrative top-view diagram of a floor layout having five zones. To keep the description instructive and minimize complexity, the zones do not correspond directly to the areas in FIG. 1. However, a correlation can be made between the zones of FIG. 2 and the areas of FIG. 1 (e.g., zone A is casino floor A 104, zone C is hotel entrance 114, etc.). In a preferred embodiment, there are permanent zones with fixed characteristics and temporary zones where the characteristics can be defined for a special purpose or on an ad hoc basis by a mobile gaming device administrator. Strictly for the purpose of illustrating the present invention, assume a simple scenario in which a gaming operator has four pre-defined levels of mobile gaming device functionality, each level including all the functionality of the levels below it. At the top is the "full-game play" level that allows full gaming functionality. Below that is a "partial-game play" level that allows only certain types of game play, such as Keno and/or Class II games such as Bingo. Next is a "non-wager game play" level that allows only non-gaming activities such as concierge services and video/audio entertainment. At the bottom is a "device disable" level, the lowest level that disables all functionality of a mobile gaming device, basically turning it off.

For background, it is useful to briefly describe the classes of gaming in the United States and how these classes can be implemented in a zone-based mobile gaming network of the present invention. Gaming in the United States is divided into Class I, Class II and Class III games. Class I gaming includes social games played for minimal prizes and traditional ceremonial games. Class II gaming includes bingo and bingo-like games, such as pulltab games. Bingo includes games played for prizes, including monetary prizes, with cards bearing numbers or other designations in which the holder of the cards covers such numbers or designations when objects, similarly numbered or designated, are drawn or electronically determined, and in which the game is won by the first person covering a previously designated arrangement of numbers or designations on such cards. Class II gaming may also include pulltab games if played in the same location as bingo games, lotto, punch boards, tip jars, instant bingo, and other games similar to bingo. Class III gaming includes any games that are not Class I or Class II games, such as games of chance typically offered in non-Indian, state-regulated casinos.

Some aspects of the invention allow a player to "get in line" for a Class III game while playing a Class II game on a mobile device until the Class III game is available. Relevant methods and devices are described in U.S. patent application Ser. No. 10/995,636, entitled "CLASS II/CLASS III HYBRID GAMING MACHINE, SYSTEM AND METHODS" and filed Nov. 22, 2004, which is hereby incorporated by reference. Preferably, the player may play the Class II game and the Class III game on the same mobile device. For example, a player may play electronic bingo on a mobile device and choose (e.g., from a menu of Class III games for which the gaming establishment has a license) to play the next available WHEEL OF FORTUNE™ game. In some implementations, the type of wagering game play allowed (e.g., Class II or Class III) is based on the zone in which the mobile device is located. However, in other implementations, so long as a mobile device is in a wagering game zone, the mobile device can be enabled to play a Class II and/or a Class III game.

A gaming operator can also define ad hoc levels of functionality, for example, that combine functionality from any of the pre-defined levels, that include only certain games from the full-game play level that impose wagering limits, or any other limitations and features the gaming operator is technically capable of including. For example, a "customized" functionality level can be created for a weekend poker event where participants can only play a new variation of poker and can only order certain food and drinks from a vendor sponsoring the event. As can be seen, there can be dozens of pre-defined and ad hoc levels of functionality defined in the mobile gaming network of the present invention.

Figure 2A:
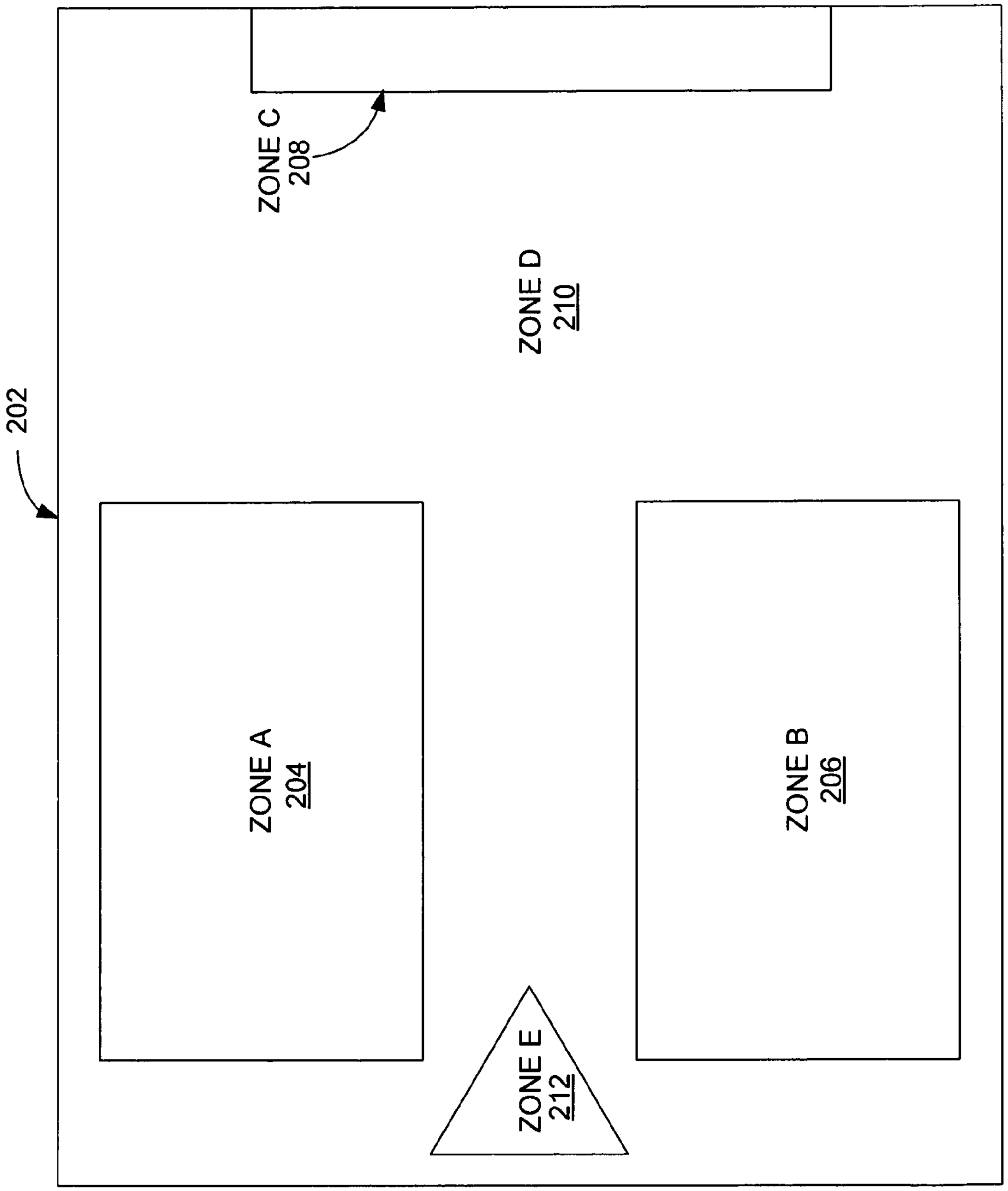
FIG. 2A is an illustrative top-view diagram of a floor layout having five zones in accordance with one embodiment of the present invention.

Referring now to FIG. 2A, a floor 202 has five zones: A 204, B 206, C 208, D 210, and E 212. Each zone is associated with at least one level of mobile gaming device functionality. Assume zone A 204 has a "full-wager game play" level associated with it. For example, it can be a casino floor, a nightclub, or bar, as described in FIG. 1. Zone B 206 is a video arcade or other area intended primarily for minors and children and has a "device disable" level associated with it. Zone C 208 is near an entrance/exit to floor 202 and also has a "device disable" level because the gaming operator may not want users taking devices outside of the casino for any purpose and to support this policy, the gaming operator disables all gaming devices entering zone C 208. The large open space shown as zone D 210 has a "partial-wager game play" level associated with it so that users can play only certain types of games but can access all non-gaming services. Finally, zone E 212 has a customized level associated with it that is active for a specified number of three days during which only a new type of wagering game can be played and only certain concierge services are accessible.

As noted above in FIG. 1, each area on a property can have an underlying zone that determines the functionality of a gaming device when it is physically present in that particular area. A zone has a level of functionality that can be predefined by the gaming operator and stored in the gaming network or be customized and created temporarily as needed by the gaming operator. As described in greater detail below, in one embodiment a mobile gaming device becomes aware when it is taken out of one area and into another. The zones underlying the areas are defined by and equipped with network components that facilitate communication between a mobile gaming network and a mobile device. The network components and components in the gaming device, described below, enable "automatic" configuring of the device's functionality as the device enters and exits various zones.

In a preferred embodiment of the present invention, communication between a mobile gaming device and a gaming network for the purpose of monitoring the location and movement of the device is implemented using near-field magnetic communication. In an alternative embodiment, statistical analysis of triangulated radio frequency signals, such as 802.11x or Bluetooth, is used to determine the location of a mobile gaming device.

Although presently most wireless communication is accomplished by propagating a radio frequency ("RF") plane wave through space, near-field magnetic wireless communication utilizes a non-propagating, quasi-static magnetic field. With near-field magnetics ("NFM"), a modulated magnetic field generated by a transducer element remains relatively localized around the transmitting device, such as an antenna. As is known in the field of wireless communication, because of this relative localization NFM communication is a wireless physical layer that is well suited for high-density, short-range streaming applications. A description of near-field magnetic communication and its relationship with radio frequency wireless technology is provided in "Near-field magnetic comms emerges," an article from the CommsDesign Internet journal, published Oct. 31, 2003 by Vincent Palermo, at commsdesign.com.

For the purposes of the present invention, a significant factor of NFM communication is the unique attenuation distance or roll off property of the magnetic field. The range for NFM induction is 1.5 to 2 meters (5 to 6.5 feet). It is predictable and reliable due to a strong 1/r(6) attenuation in magnetic-field energy. In the context of short-range communication, NFM's short roll-off behavior is a unique advantage. The tight communication "bubble" enabled by NFM allows a modest bandwidth generated with very low power to be spatially allocated among multiple transmission points. In addition, near field magnetic field characteristics are relatively unaffected by the surroundings, as magnetic fields reliably follow the 1/r(6) behavior regardless of the presence of metal objects, conductive materials or people.

Figure 2B:
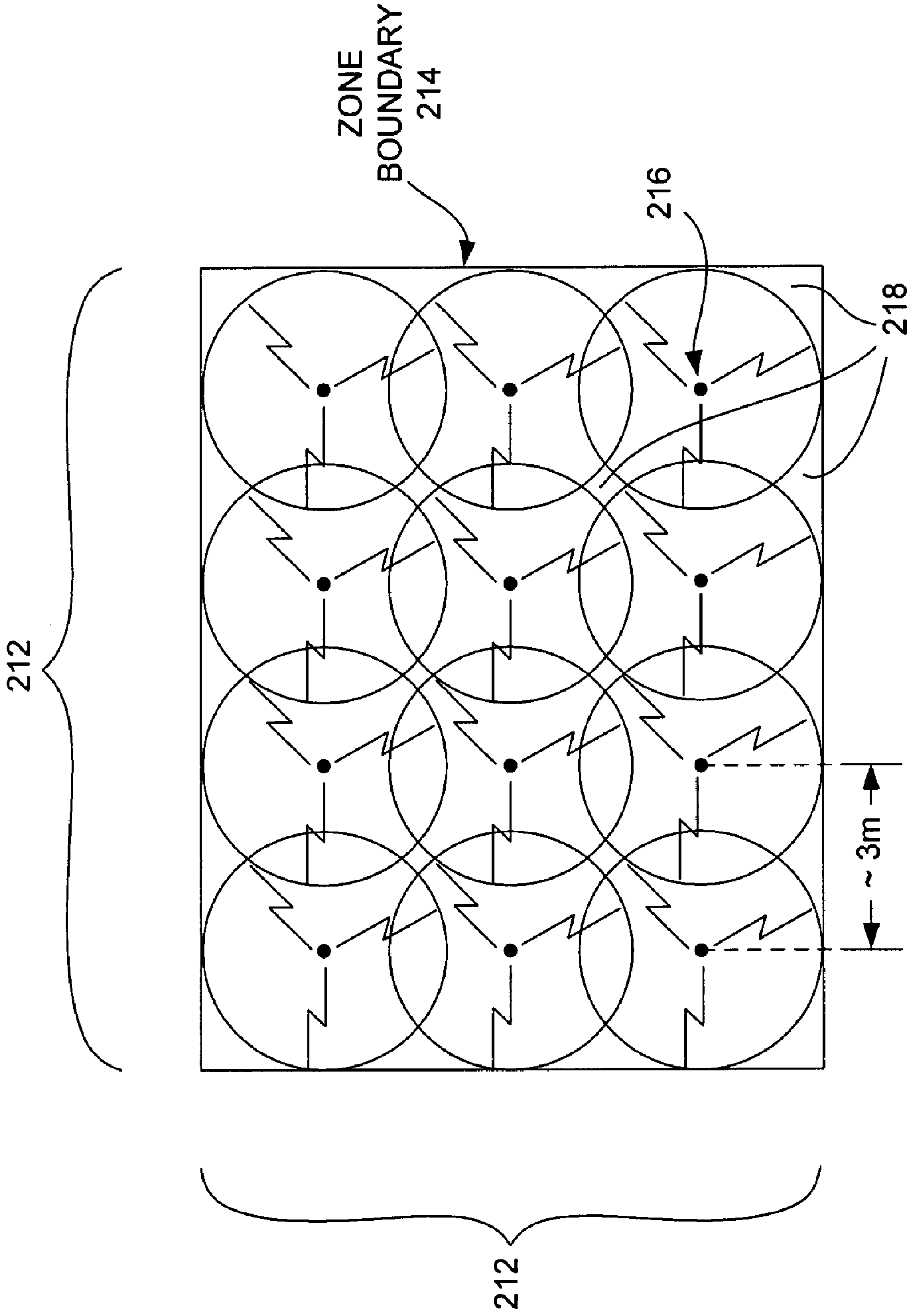
FIG. 2B is an illustrative top-view diagram of one zone showing near-field magnetic antennas and range of transmission.

In a preferred embodiment, NFM communication is used to transmit a security signal originating from a network component, such as a mobile gaming server, to a mobile gaming device. As described in greater detail below, NFM signals emanate from antennas in a zone and are received by a mobile gaming device that is within two meters of the antenna. Because the signal will attenuate significantly after traveling approximately two meters, where the signal is at 1.56% of its original strength, in one embodiment, antennas, such as antenna 216 are placed approximately three meters apart. In this manner, NFM communications is used to create a "mesh" 212 within a zone boundary 214 as shown in FIG. 2B. A near-field magnetic antenna 216 is a transmitter that can be permanently secured, for example on top of a gaming machine or affixed from a ceiling or wall or be temporarily placed as described above. Antennas can be placed closer together to completely eliminate any "no reception" areas such as regions 218.

Figure 3:
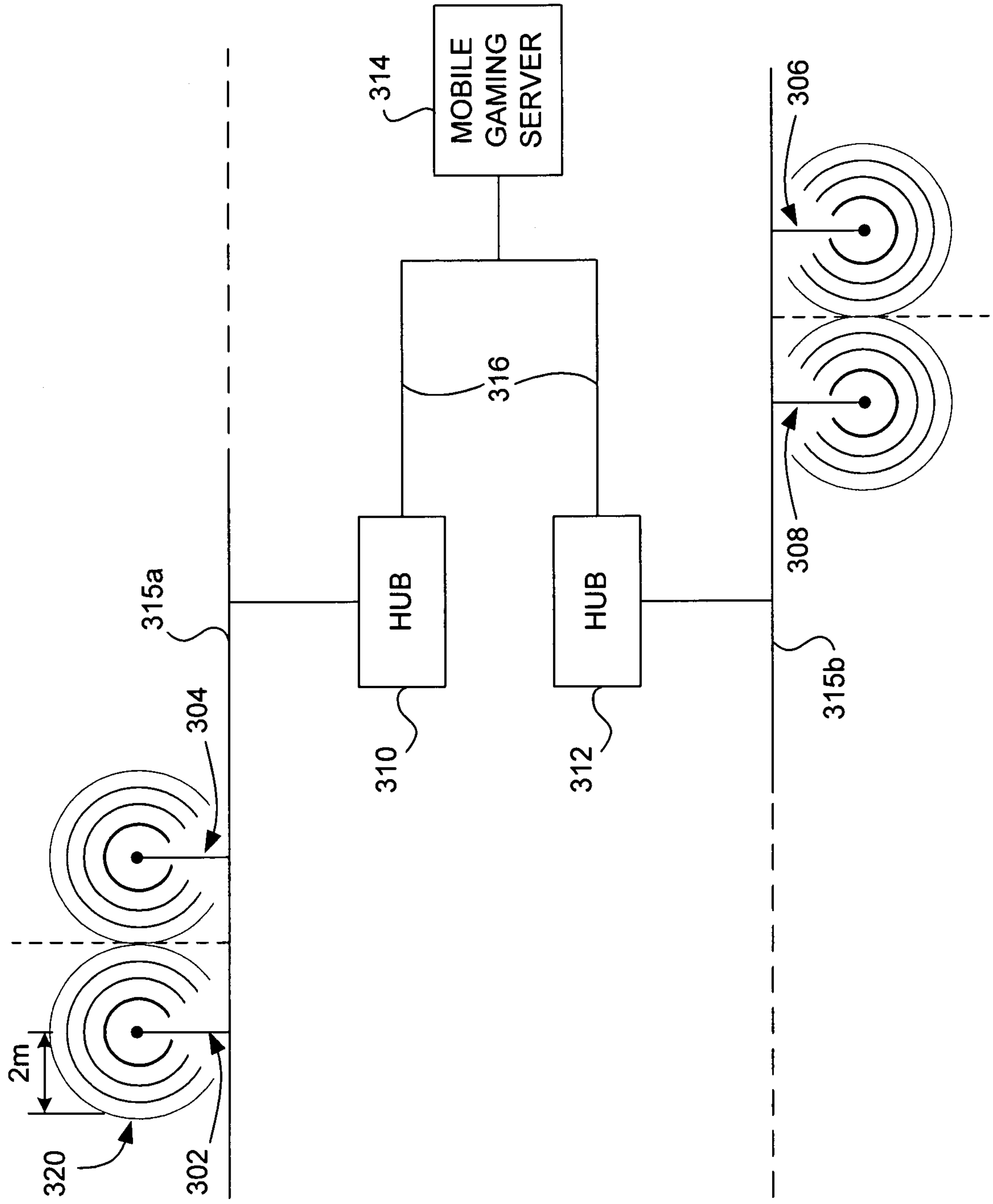
FIG. 3 is a diagram showing various network components in a near-field magnetic gaming network in accordance with one embodiment of the present invention.

FIG. 3 is a diagram showing various network components in a near-field magnetic gaming network in accordance with one embodiment of the present invention. Shown are four NFM antennas 302, 304, 306, and 308. Antennas 302 and 304 are four meters apart, as are antennas 306 and 308. In other preferred embodiments, the antennas can be placed further apart or closer to each other. The distance between NFM antennas will depend on the degree of connectivity desired between the mobile gaming device and the gaming network. As described in FIG. 2B, the more densely the antennas are configured, the less likely there will be any spot in the zone where the mobile device will not receive a security signal. For example spots 218 are approximately one square foot. The signal strength attenuates or falls off at a ratio of 1/r(6) as the distance from an antenna increases, as represented by the circular lines emanating from the end of the antennas shown in FIG. 3. An outer line 320 shows where the signal becomes too weak to be detectable for most practical applications. For example, at three meters, the strength of a NFM signal is 0.14% of the original signal strength.

In a preferred embodiment, the antennas are connected to base stations or hubs 310 and 312, via network connections 315*a* and 315*b*, which receive and send signal data to mobile gaming server 314 via network link 316. Hubs 310 and 312 convert signals and act as routers for a group of antennas. For example, antennas 302 and 304 are part of one group or cluster of NFM antennas and are connected to a single base station. Hubs 310 and 312 can be RF or NFM base stations depending on which wireless communication standard is used.

The rapid attenuation of NFM signals allows for a tightly controlled transmission range from the transmission point of the antenna. Because of this unique characteristic, a sufficiently accurate proximity measurement of a mobile device is attainable using NFM communication for purposes of implementing the mobile gaming device tracking network of the present invention.

In another embodiment, statistical analysis of triangulated radio signals, such as 802.11x or Bluetooth, can be used to determine the location of a mobile gaming device. By analyzing the variations between the time RF signals from the device are received by different access points, the position of the device can be determined. This analysis calculates an allowable change in relative position from a previously known position within specified time periods. For example, if that change is considerably outside the time range that would be needed for a person to walk in that amount of time, it may indicate that the gaming device was not actually within a particular zone. This may flag a further check to make ensure that a user had not compromised the mobile gaming device system.

Figure 4:
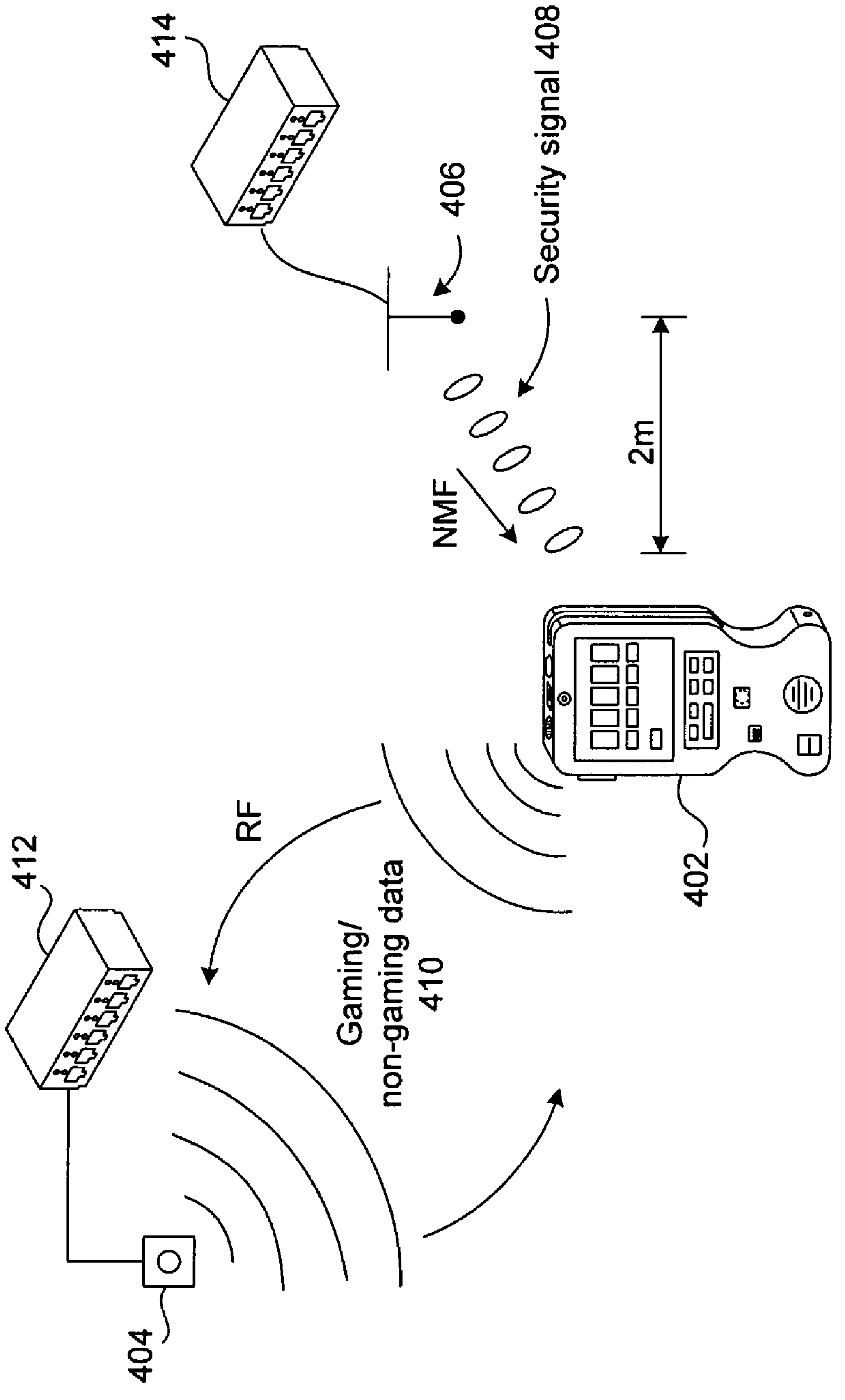
FIG. 4 is a diagram showing a mobile gaming device using RF and NFM standards for communicating with a gaming network in accordance with one embodiment of the present invention.

In a preferred embodiment, RF wireless technology is used to transmit actual wager gaming and non-wager gaming data between a mobile device and a gaming network. Use of NFM communication for transmission of the security signal (or for any other purpose) does not exclude or bar the use of other types of wireless data transmission protocols. FIG. 4 is a diagram showing a mobile gaming device using RF and NFM standards for communicating with a gaming network in accordance with one embodiment of the present invention. A mobile gaming device 402 receives data from two transmitters, an RF transceiver 404 and a NFM antenna 406. NFM antenna 406, connected to an NFM hub 414, transmits a security signal or beacon 408 which device 402 will detect if the device is within two meters of antenna 406. Device 402 also receives and transmits gaming and non-gaming data 410 with RF transceiver 404, which is connected to an RF hub 412. One example of data that are transmitted from the gaming network to the mobile device is various messages regarding all aspects of game play, non-gaming services, and general administration of the device. These include messages regarding fund transfers (e.g. wins/losses, deposits, withdrawals), registration (player, device, zone, and so on), game requests, player tracking, warning messages (e.g., "Device will be disabled," "approaching zone perimeter" etc.), audit/verification/control, session information (e.g., sleep, termination, screen freeze, and so on).

In another embodiment, near-field magnetic induction can be used as an alternative, redundant communication data channel for gaming and non-gaming data, essentially as a "back-up" communication means to an RF link. In yet another embodiment, near-field magnetic induction can be used not only for transmission of a security signal but for all data transfer between a device and the gaming system. Networking topologies, techniques and components for implementing NFM transmission and for concurrent NFM/RF data transmission are well known in the field of short-range wireless communication.

In a preferred embodiment, the mobile gaming device is capable of receiving NFM signals emitted from an antenna or transmitter. Security signals emitted from NFM antennas intended for detection by mobile gaming devices can be described as beacons or "heartbeats" in the wireless communication field. NFM antennas or transmitters can be affixed at any suitable location, such as on top of gaming machines, from ceilings, embedded in walls, counters, bars, and so on. In order for an NFM beacon to be detected by a gaming device at all times while the device is in a zone, the antennas are preferably not further than approximately 2.5 to 3 meters apart.

In a preferred embodiment a mobile gaming device must detect an NFM signal with a pre-defined time interval to be operable. If the device does not "hear" a heartbeat within x seconds, it essentially shuts down after game states and other basic data are saved. Such data may be saved by the mobile device and/or by another device, such as a server, a network storage device, etc. The value of x can be determined by the gaming operator. So long as an authorized user keeps the device in an area of the hotel or resort that has an underlying NFM zone, the device will be operable. This is true because all zones have a sufficient density of NFM antennas that create the mesh described in FIG. 2B.

In a preferred embodiment, a device detects an anonymous, broadcasted beacon from any antenna in a zone. In another preferred embodiment, there is a unique, unicast-type communication between a gaming device and the gaming network. In this type of communication a unique heartbeat with a "signature" is intended for reception by a particular mobile device. Each mobile gaming device has a mobile identifier that is unique within a network of mobile gaming devices (e.g., within all the mobile gaming devices at one casino). This implementation provides comprehensive control by the gaming operator (or gaming device administrator) over each device and provides interactivity between an individual gaming device and a gaming server. A unique device ID and a unique NFM heartbeat for that device allow the mobile gaming system to easily locate a specific device in the network. However, in this embodiment, each mobile device may require a thread and thus some resources in the gaming network will be devoted to thread management. In another embodiment, a broadcast communication is used to communicate from the mobile gaming server, via NFM base stations, to each device. Although this method requires less maintenance and thread management, it lacks the interactivity between server and device. Some implementations for locating a gaming unit are described in commonly assigned U.S. patent application Ser. No. 10/127,363, titled "Gaming System Allowing Location Determination of a Gaming Unit in a Casino," filed Apr. 22, 2002, incorporated herein in its entirety and for all purposes. In these implementations a gaming unit transmits a location-determination signal to receivers which generate corresponding reception signals that are sent to a central controller programmed to determine the location of the gaming unit, such as a mobile gaming device.

In another preferred embodiment, there is a correlation between an authorized user of a mobile gaming device and a unique "signature" security signal. At the time a user registers for and checks out a mobile gaming device, the user is assigned a unique identifier. At the same time, the user identifier is associated with the unique ID of the mobile device registered to the user. These associations and assignments are stored in a mobile gaming server, such as server 314 in FIG. 3, and each mobile gaming device is managed by one or more of such servers.

FIG. 5A is a block diagram showing in greater detail mobile gaming server 314 in accordance with one embodiment of the present invention. A mobile gaming server 502 has a database 504 containing user and device identifiers, listed in a USER ID field 506 and a DEVICE ID field 508, each user identifier corresponding to a device identifier. This enables communication between server 502 or any other server within the gaming network and a gaming device registered to a specific user. It also allows for customization of the gaming and non-gaming software on the device for that user, such as establishing betting limits, bonus eligibility, player preferences, EFT data, and so on.

In another preferred embodiment, a mobile gaming device is associated with one or more zones within a mobile gaming network thereby enabling a concept referred to as zone differentiation for a mobile gaming device. Device/zone database 510 has DEVICE ID field 508 and a ZONE ID field 520 that indicates which zone or zones a particular mobile gaming device is registered for. As described above, in one embodiment zones are network segments that implement mobile gaming device functionality in spaces and areas in a gaming environment, such as a hotel or resort. In one embodiment, zones can be permanent or created for temporary use, such as for special events. A basic tenet of the mobile gaming device system of the present invention is that a mobile gaming device is operable only if it is physically in a zone where it can detect an NFM beacon. In a preferred embodiment, a mobile device can be programmed or "hard coded" to only operate in one or more assigned zones, a restriction that is programmed when the device is registered to and checked out by a user. Antennas or transceivers in a particular zone can transmit beacons that are zone-specific. Near field magnetic or RF base stations in the zone can be programmed to transmit beacons from transmitters in the zone that are characteristic or unique to that zone. For example, in this embodiment, a mobile gaming device may only be operable in a certain area, such as at the pool or in the convention center and in no other zone even if gaming is allowed in that zone. This feature also facilitates management of the gaming devices by allowing a gaming operator to keep track, at least to some degree, of where devices are used allowing them to retrieve a gaming device if necessary. Thus, to implement zone differentiation, a device is able to read or detect security signals only from antennas or transceivers in the allowed zone or zones. Once a mobile device is taken into an authorized zone by a user, the device begins detecting NFM or RF beacons that are specific to that zone and the device becomes operable.

Also shown in FIG. 5A is a zone/data database 512 having ZONE ID field 520 and a DATA field 518. Server 502 or another suitable server in the gaming system can program, customize or modify a device depending on which zone the device is in via RF, NFM, or other wireless standard. In a preferred embodiment, server 502 stores data on games, zone-specific gaming and non-gaming data, and other data specific to a zone in DATA field 518. Thus, using device/zone database 510 and zone/data database 512, server 502 or another server in the gaming network and system can program or customize a mobile device based on zones in which the device can operate.

As described earlier, there may also be pre-defined levels of mobile gaming device functionality which can also be stored in DATA field 518 in zone/data database 512. Also shown in server 502 are device specific data 514. These data include specific information (e.g., serial number, type of device, etc.) on each mobile gaming device controlled and managed by gaming device server 502. For those devices that have been programmed to operate only in specific zones, device registration data 514 also include a listing of registered zones for each such device, similar to and as an alternative source for data contained in device/zone database 510. The arrangement and storage of device, zone, and user data described herein can vary widely. These data can be stored on one server or across a number of network components, network storage access devices, gaming servers, gaming machines, hubs, and so on. For example, some or all the data described can be in one relational database, a multi-dimensional database, or stored as objects in an object-oriented schema. The mobile device management and zone configuration of the present invention is not limited to or dependent on a specific implementation of how and where the device, zone, user, and other related data are stored on the various network components.

Figure 5B:
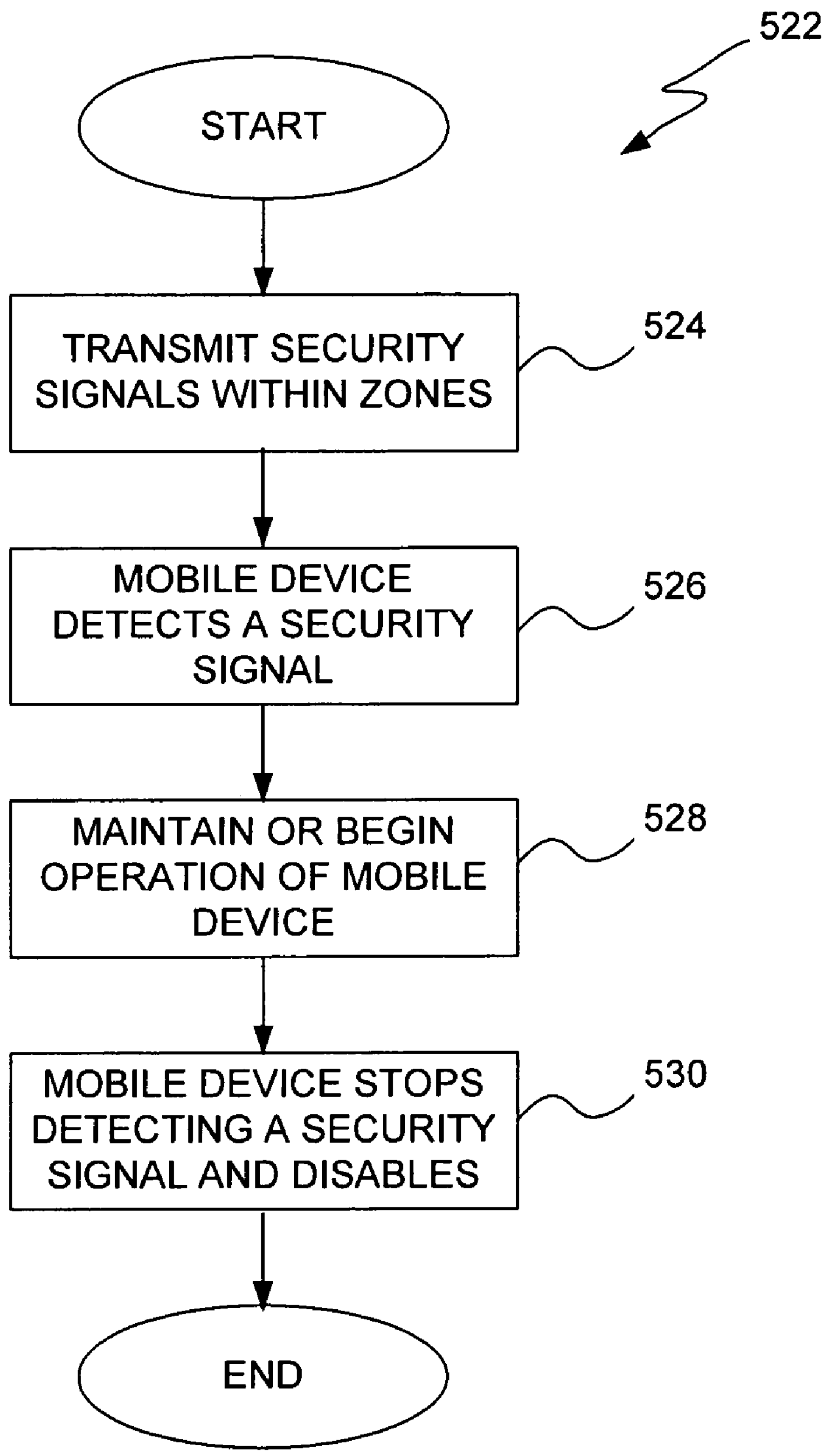
FIG. 5B is a flow diagram of a process for enabling and disabling game play on a mobile gaming device in a zone-based network in accordance with one embodiment of the present invention.

FIG. 5B is a flow diagram showing a process 522 of managing mobile wager gaming devices in a wireless gaming network in accordance with one embodiment of the present invention. Steps of the methods shown and described herein need not be performed (and in some implementations are not performed) in the order indicated. Some implementations of these methods may include more or fewer steps than those described. Assume a user has registered for and checked out a mobile gaming device having a unique mobile identifier from a gaming operator at a hotel. For the purpose of illustrating a scenario in which a mobile gaming device is used, assume the device has no zone restrictions and is not being used for a special event. The user intends to use the device for wager gaming in all areas of the hotel that allow mobile wager gaming.

At a step 524 NFM security signals are transmitted from a NFM antenna or transmitter in the zones of the gaming environment. Security signals can also be implemented using RF transmitters. Each zone in the gaming environment has transmitters that transmit security signals. The density or proximity of the transmitters in each zone will depend on the communication standard used and to a lesser degree the power of the signal. However, regardless of the standard used, security signals transmitted in a particular zone should attenuate to a negligible strength before crossing a zone boundary.

At a step 526 the mobile device detects a security signal. The mobile device has an appropriate communication interface to detect the security signal. If the security signal is an NFM signal, the device has a NFM communication interface, as described in FIG. 7 below. Similarly, if RF or another communication standard is used, the device has the appropriate communication interface to detect the signal. If the user has the device in an area of the casino or hotel that does not have an underlying zone, there are no security signal transmitters and the device is inoperable or disabled for any purpose, including non-wager gaming services. Conversely, an area where wager gaming is allowed, such as a casino floor, may not have an underlying zone. It is the decision of the gaming operator to make an authorized area (based on mobile gaming regulations) an actual mobile gaming zone by placing security signal transmitters in the zone and configuring a wireless network for transmission of wager gaming and non-wager gaming data.

At a step 528 the mobile device begins operation or maintains operability (if it was already in a zone) upon detecting a security signal. When the user initially brings the mobile device into a zone from a non-zone area, the device will detect a security signal and become operable, for example, by coming out of sleep mode and displaying a message to the user. If the zone is a wager gaming zone, the user can begin using the device for game play. If it is a non-gaming zone, the user can use the device for non-gaming services and entertainment. Other possible zone categories include, but are not limited to, temporary wager gaming zones, partial or limited wager game play zones, and so on. As described above, the device knows which zone category it is in by characteristics of the security signal.

At a step 530 the mobile device is taken out of a zone and stops detecting a security signal. If the device does not hear a heartbeat within a pre-defined time period, it knows that it is no longer in a zone and will terminate operation, disable, or go into a sleep mode, at which stage the process ends. Before this occurs a message may be sent to the device to inform the user that the device is about to "shut down" and that game state data and other data needed to recover to the current state will be saved.

During process 522, the mobile gaming device either alone or in conjunction with the gaming network ensures that the person holding and using the mobile gaming device is the authorized user of the device. The device should not be checked out by one individual—the authorized user—and then given to a second individual for use, regardless of whether that use is only for non-wager gaming services and or is being used by another adult. Naturally, one important goal here is to ensure that minors do not use the device for wager gaming under any circumstances, even if an adult is overseeing or "supervising" use of the device. Other considerations may include preventing the device from being handled by individuals who want to tamper or breach the security of the device and its gaming software.

As described below, means for ensuring that only an authorized user is using the device include having various well-known biometric mechanisms built into the device and using capacitive touch sensing devices to detect a user's touch, for example when holding or pushing a button on the device. In addition there are additional user identification means that can be used as a preliminary check on a user's identity or as a redundant or back up check if there is a question of user authentication based on biometric readings. These additional identification means include essentially non-biometric verifications such as the use of identification certificates and transaction certificates with respect to software components or code that might be stored on a given mobile device, and the use of RFID readers and cards, tokens, bracelets and the like.

In another embodiment of the present invention, a mobile gaming device can be specialized or "hard coded" to play only a particular wagering game, such as Blackjack or poker. Similarly, the device can be specialized to enable a specific feature such as back betting. In another preferred embodiment, a mobile gaming device is a display having a user interface and other components, such as a network interface but is not capable of executing wager gaming operations. In this embodiment, the device may receive game result data from a gaming server or other network device. This configuration is more secure and decreases the liability and danger of the gaming machine being hacked.

There are many variations on managing and regulating the use of mobile gaming machines based on their physical locations and "traffic patterns." For example, a mobile gaming device can permanently disable itself (until re-registered) if it is taken outside a zone to a non-zone area more than a threshold number of times in a given time period. For example, this may be desirable if a device is taken outside a hotel to a public street or sidewalk or into a hotel room or restroom more than an expected or normal number of times, indicating potential misuse or tampering.

Figure 6:
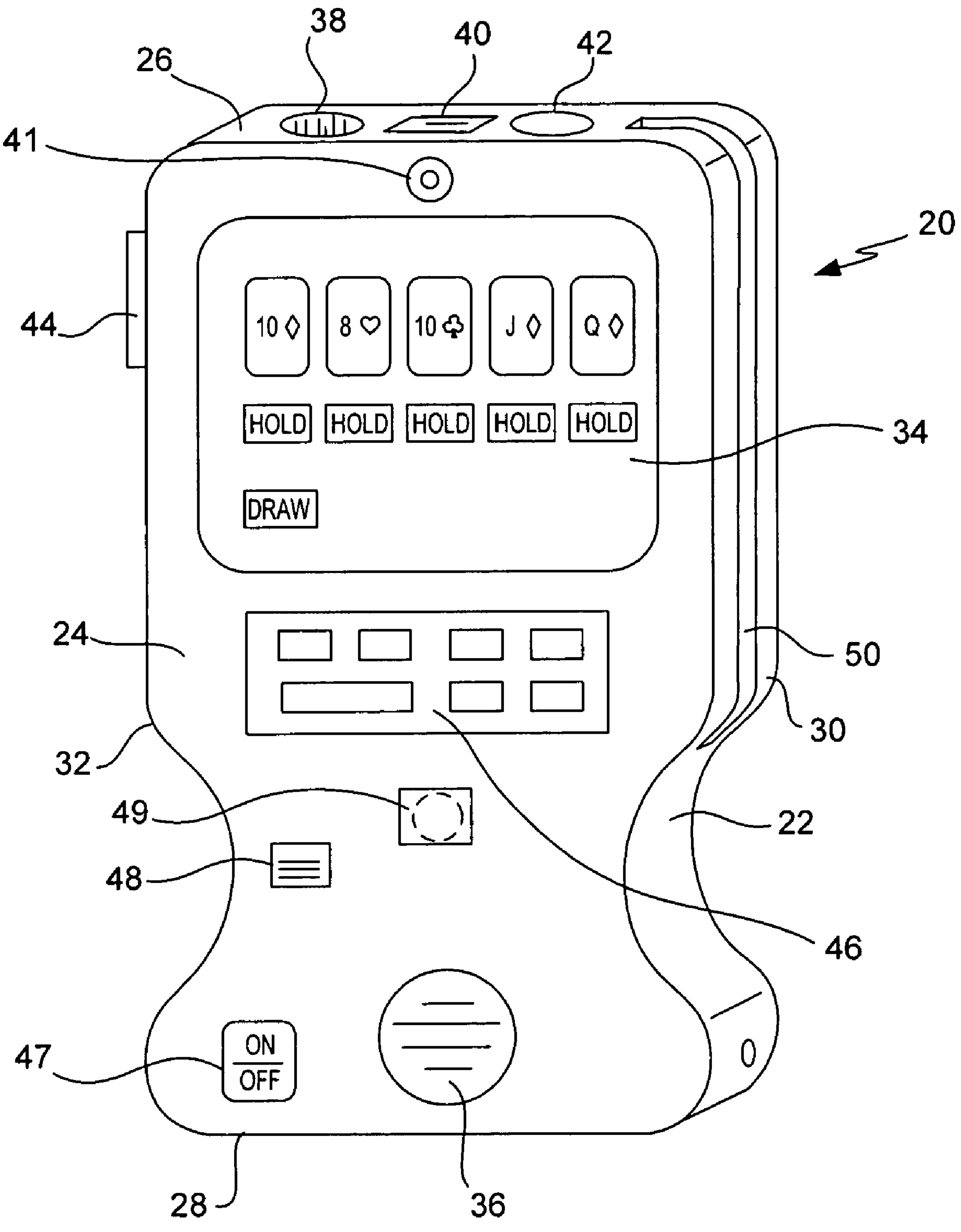
FIG. 6 is a perspective drawing of an exemplary mobile gaming device in accordance with one embodiment of the present invention.

FIG. 6 illustrates an exemplary mobile gaming device 20 in accordance with one embodiment of the invention. In general, mobile device 20 includes a body or housing 22. Body 22 may be constructed from a wide variety of materials and be in one of many shapes. In one embodiment, the body 22 is constructed from one or more molded polypropylene or other plastic components. The body 22 may be constructed of metal or a wide variety of other materials. As illustrated, the body 22 is generally rectangular in shape, having a front side or face 24, a rear side or face (not visible), a top end 26, a bottom end 28, a first side 30 and a second side 32. Preferably, the body 22 defines an enclosed interior space (not shown) in which a variety of components are located as described below.

In a preferred embodiment, mobile device 20 is adapted to present video and sound game data to a player. As illustrated, mobile device 20 includes a display 34. The display is located in the front face 24 of the body 22, thus facing upwardly towards a player. In a preferred embodiment, the display 34 comprises a liquid crystal display ("LCD"), and in particular, an LCD permitting touch-screen input. It will be appreciated that other types of displays may be provided. Mobile gaming device 20 also includes a sound-generating device in the form of at least one speaker 36. In one embodiment, the speaker 36 is positioned beneath a top or cover portion of the body 22 having one or more perforations or apertures therein through which the sound may readily travel. As illustrated, the speaker 36 is located near the bottom end 28 of the body 22, generally opposite the display 34. It will be appreciated that the speaker 36 or additional speakers may be provided in a wide variety of locations, such as at one or both sides 30, 32 of the body 22.

In a preferred embodiment, mobile device 20 is adapted to send and/or receive data from another device. As such, mobile device 20 includes one or more data input and/or output devices or interfaces. In one embodiment, mobile device 20 includes an RS-232 data port 38 for transmitting and accepting data, such as through a cable extending between mobile device 20 and another device, such as a computer. In one embodiment, mobile device 20 includes a USB data port 40 for transmitting and accepting data, also through a cable. In one embodiment, mobile device 20 includes an infrared data transmitter/receiver 42 for transmitting information in wireless, infrared light form. In a preferred embodiment, mobile device 20 includes another wireless communication device 44, such as a wireless communication device/interface operating at radio frequency, such as in accordance with the IEEE-802.11x or the Bluetooth standard, or operating according to NFM standards as described above.

A user provides input to mobile device 20, such as for playing a wagering game or for a non-gaming service. As stated above, one means of input may be through the display 34. The display 34 may also be arranged to accept input via a stylus or other device. In one embodiment, mobile device 20 includes a keypad 46. In one or more embodiments, the keypad 46 is a sealed keypad having one or more keys or buttons. Mobile device 20 can include a microphone 48 arranged to accept voice input from a player. Other input devices may alternatively be provided or be provided in addition to those input devices described. For example, a player may be permitted to provide input through a joystick (not shown). The joystick may comprise a control element associated directly with the body 22 of mobile device 20. Alternatively, the joystick may be separate from mobile device 20, and then be placed in communication therewith, such as by plugging in the joystick to a data port of mobile gaming device 20. A smart card reader, optical reader or other input device may be provided for reading information from another element, such as a card, ticket or the like. Mobile gaming device may also include a keyboard or mouse.

In one embodiment, mobile device 20 includes an image collection device 41, such as a camera. The image collection device 41 may be used, for example, to capture the image of a user or player of mobile device 20. This image information may be used for security or authentication purposes, as set forth in greater detail below. Mobile device 20 may also include a fingerprint scanner 49. In one embodiment, as illustrated, the fingerprint scanner 49 may be located behind or beneath a user input button, such as a "spin" or "draw" button. In this manner, a player's fingerprint may be obtained without the user or player having to be consciously aware that a fingerprint is being provided participate (although informed, for example during device registration and check out, that a fingerprint can be taken when the buttons are pressed). As described below, a player's scanned fingerprint information may be used for authentication purposes. Mobile device 20 may also include a card reader 50. As illustrated, the card reader 50 is located in a side 30 of the body 22 of mobile device 20. In a preferred embodiment, the card reader 50 comprises a magnetic stripe reader for reading information from a magnetic stripe of a card. The card reader may also be adapted to write or store data to a smart card or portable memory module.

As illustrated, the card reader 50 includes a slot that is positioned in the side 30 of mobile device 20. Mobile device 20 may be battery-powered, such as with a rechargeable battery pack. An ON/OFF button 47 may be provided for controlling the power to mobile device 20. As described in greater detail below, mobile device 20 may be docked at or otherwise associated with a free-standing electronic gaming machine or other gaming device. At such times that mobile device 20 is docked, the internal battery of the device can be recharged for later use in an undocked or "remote" mode, as will be readily appreciated. Appropriate detection provisions, warnings and safeguards for a low battery status in mobile gaming device 20 while in such a remote mode can also be provided.

Figure 7:
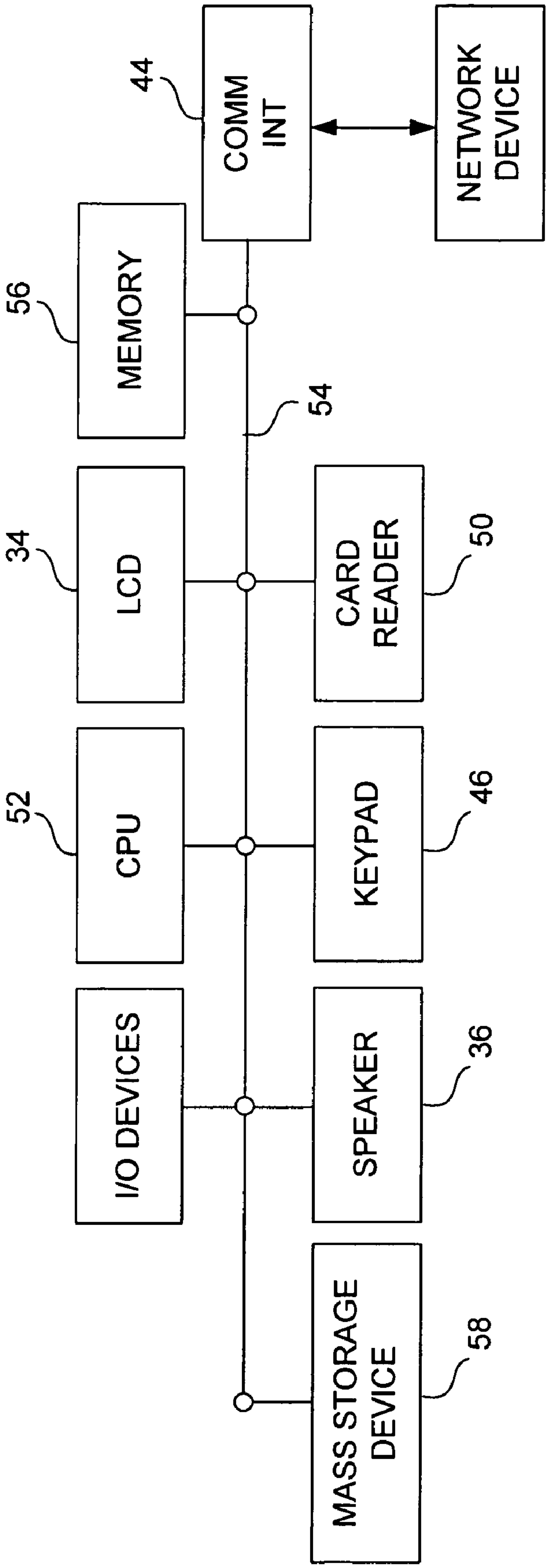
FIG. 7 is a block diagram of a component arrangement and control means of a mobile gaming device in accordance with one embodiment of the present invention.

Preferably, mobile gaming device 20 includes control means for controlling the operation of the device, including accepting input and providing output. One embodiment of such a control means is illustrated in FIG. 7. As illustrated, mobile gaming device 20 preferably includes a computing environment serving as the control means. The computing environment includes a central processing unit 52. The central processing unit 52 preferably comprises a microprocessor. The central processing unit 52 is associated with a bi-directional system bus 54. The system bus 54 may contain, for example, address lines for addressing a video memory or main memory. In addition, the system bus 54 preferably includes a data bus for transferring data between and among components associated with the bus 54. Alternatively, multiplex data/address lines may be used instead of separate data and address lines.

The display 34 is coupled to the bus 54. In one embodiment, a video memory (not shown) is provided in association with the bus 54. The video memory may be dual-ported video random access memory. The video memory is preferably coupled to and arranged to drive the LCD display 34. Of course, the video memory might be coupled to a CRT or other suitable display device. A memory 56 is associated with the system bus 54. In one embodiment, the memory 56 comprises dynamic random access memory ("DRAM"), synchronous DRAM or other forms of random access memory. The memory 56 may have other forms as well, such as electronically erasable programmable read only memory ("EEPROM"). Preferably, the memory 56 is of the type that permits data to be written thereto and read there from. A mass storage device 58 is preferably also accessible via the bus 54. The mass storage device 58 may be of the read-only type (such as a CD or DVD optical drive) or may be of the read-and-write variety such as flash memory, compact flash, or CD/DVD-R/W drives.

As illustrated in FIG. 7, the variety of input and output devices can be associated with the system bus 54, and thus the other components associated with the bus. As illustrated, the speaker 36, keypad 46 and card reader 50 are associated with the system bus 54. A variety of data input/output devices ("I/O Devices") may also associated with the system bus 54, such as, though not specifically illustrated, the RS-232 port 38, the USB 40, and the infrared communication transmitter/receiver 42. As will be appreciated, these devices/elements may operate in accordance with different protocols and have different architectures, and have appropriate interfaces provided for communicating with the system bus 54. For example, the infrared transmitter/receiver may have different layers, including a physical layer including the light-emitting device, and link and other layers which include software and/or hardware, as is known. A variety of other input/output devices may be associated with mobile device 20, as now known or later developed.

Preferably, as stated above, mobile device 20 includes a wireless, radio frequency communication interface 44 operating in accordance with the IEEE 802.11x or Bluetooth standards. In another embodiment, communication interface 44 operates according to near-field magnetic communication standards that enables device 20 to receive and transmit NFM signals. The architectures and protocols of these and other wireless communication interfaces are well known in the wireless technology field. In general, however, interface 44 permits two-way data communication. As described in detail, mobile device 20 may be permitted to communicate with a wide variety of devices/systems, including at least one device associated with a gaming network, such as an RF transmitter or an NFM antenna. In accordance with the invention, mobile device 20 can send data and receive data, including program code, through the communication interface 44 (or the other input/output devices, such as the infrared transmitter/receiver). As one example described in more detail below, a gaming server may transmit requested code for an application via a transceiver to the communication interface 44 of mobile device 20. The received code may be executed by the central processing unit 52 as it is received and/or be stored in the memory 56 for later execution. In one embodiment, mobile device 20 may include a mass data storage device 58 such as a hard drive, CD-ROM or the like. In one or more embodiments, the memory 56 may comprise a smart card or similar easily removable (and replaceable) device. In such event, data, such as operating code, may be associated with mobile device 20 via a CD-ROM placed in a CD-ROM drive or by insertion of a coded smart card or portable memory module.

Although the foregoing exemplary mobile gaming device 20 is fairly specific with respect to many details, it will be readily appreciated that a wide variety of similarly suitable devices can also be used as a mobile gaming device. Other exemplary mobile gaming devices and features thereof are provided in commonly owned U.S. Pat. No. 6,846,238, issued to Wells, and entitled "Portable Game Player," which is incorporated herein by reference in its entirety. Additional features and applications for a suitable mobile gaming device can also be found in commonly owned U.S. patent application Ser. No. 10/937,990 by Nguyen, et al., entitled "Apparatus and Methods for Wireless Gaming Communications," which is also incorporated herein by reference in its entirety. It will be appreciated that not all items and features of the above and incorporated mobile gaming devices may be required for a given mobile gaming device or associated system, and that other items and features not disclosed may also be included. In some cases, a mobile gaming device can be provided by the casino or gaming operator, such as through sales, rentals or checkout procedures, while in other instances, a suitable mobile gaming device can be an outside device that is provided by the player or another third party. Such a privately owned outside mobile gaming device can be, for example, a personal desk or digital assistant ("PDA"), laptop, tablet PC, MP-3 players, cell phone (e.g., a Blackberry® or Treo® type phones), video gaming consoles, or any other similarly suitable device. As discussed herein, it will be understood that use of the term "mobile gaming device" can refer to the exemplary mobile gaming device 20 disclosed above, as well as any other suitable device that can serve as a mobile gaming device for any purpose of the present invention, and that such a device or devices may or may not be portable or hand-held. Further, while use of the terms "portable" and "mobile" gaming device are used, it is understood that use of other suitable non-portable mobile gaming devices may be substituted in relevant instances.

In a preferred embodiment, enforced associations and rules among users, mobile gaming devices, and zones are used to perform verification and authentication in the mobile gaming device tracking and zone network of the present invention. These associations and rules can be described collectively as a "virtual leash". A repeated checking of a mobile device, its location, and biometric data of the user holding the device can be performed, whereby wager-based gaming at the personal gaming device is suspended or terminated if such items cannot be authenticated or verified on a repeated basis. Such repeated checking can be considered another type of "heartbeat," with system alerts, alarms, player warnings and/or termination or suspension of a gaming session taking place depending upon the nature of a heartbeat violation.

As described, this comprises a system in which activation information is transmitted to mobile device, and where if the information is not received or confirmed, mobile device will not present games for play and/or may even emit an alarm or other alert signal, or disable. This prevents, for example, a user from taking mobile device or attempting to use it in unauthorized zones or areas. This can also prevent the illegal or unauthorized use of mobile device, such as by a minor. Further details of such a virtual leash type configuration are provided below.

In a preferred embodiment, a mobile gaming device includes features adapted to detect that an authorized or proper player is currently holding mobile device. As noted above, this might be accomplished by using capacitive touch sensing devices embedded into the edges of mobile device. Such devices could be similar to touch-style light switches and would be used by the software operating on mobile device to detect that the player is still in possession of mobile device. Should the player set mobile device down or otherwise lose physical connection to the device, the operating software will sense this, notify the system via a wireless RF or NFM connection that the user is no longer in possession of the unit, and revert to an idle mode or disable. Should the player pick up mobile device again, the device might require a complete re-authentication of the user, such as via one or more biometric sensing methods. Also, at periodic events determined by the operating software, mobile device may ask the player to re-authenticate herself in order to continue with a particular gaming session.

Another method that might be used to determine that only a properly authorized player is playing mobile device is to use some form of secondary identification and an associated detection device. Such secondary player identification can involve, for example, an RFID player tracking card or other suitable RFID item and an RFID reading device and system. Details for such personally identifying RFID related gaming devices and features thereof are provided in commonly owned and U.S. patent application Ser. No. 10/897,822, by Benbrahim, filed Jul. 22, 2004, and entitled "Remote Gaming Eligibility System And Method Using RFID Tags," which is incorporated herein by reference in its entirety and for all purposes. In practice, rather than require the player to continually provide his or her fingerprint or other biometric identification on a regular basis, mobile device or other system device could periodically "ping" the secondary player identification item, such as an RFID card, token, bracelet or the like, and expect a correct response. In effect, this pinging of the secondary identification device can then become the effective heartbeat of the virtual leash or leashes. If no response or an incorrect response is received (i.e., no heartbeat or improper heartbeat), then mobile device could be adapted to suspend game play immediately and require an actual biometric authentication for the authorized player.

In some embodiments, the determination of a proper or authorized user or player may depend on a previously established list of one or more users or players who are authorized to play according to a variety of potential factors, such as for a given game, a given mobile gaming device, or at a given area or zone. Such pre-approved users or players may be limited to the user who owns or checks out mobile device, or the user who buys the game seeds, for example. In other embodiments, a group of players may be listed as those who are authorized to play a given game, on a given mobile gaming device, or at a set location. For example, while a husband might be the person who checks out a mobile gaming device and/or purchases games seeds for the play of games on mobile device, both the husband and wife might be listed as authorized or proper players for those games on that mobile gaming device. As such, a first user might buy the game seeds or otherwise determine what games or how many games are to be played on a mobile gaming device, while a second user might be the one to actually play or request play of the games. As noted, in some instances, it may be preferable to restrict the second user to be the same person as the first user, while in others, a group of users may be eligible to be such a second user. In still further embodiments, it may be possible for the second user to be separate from the first user, such as where a person might want to buy games for another person or group of people not including the buyer, and a restriction is created that the recipient or recipients be the only proper or authorized players.

Another form of virtual leash can be created with respect to an appropriate zone for mobile device in order to conduct wager based gaming activities on the device. As described in detail above, NFM or RF transmitters or other sensing means can be used to allow gaming operation only when mobile device is located in specific zones. As in the above embodiments involving a player-specific virtual leash, mobile device can be rendered non-operational when it is removed beyond the boundary of a zone, such as a legal gaming area, particularly with respect to wager based gaming activities.

In some embodiments, such a location based virtual leash can also provide a means for ensuring that gaming operator-owned proprietary mobile gaming devices are returned and not stolen. For example, where a casino owned or other non-player owned mobile gaming device is removed from an authorized zone, detection of such a removal could be made immediately, and one or more security measures could be activated. Such security measures might include an alert to the system and/or various casino personnel or security, as well as a loud audible signal. Such a signal could be a warning message to a player, as well as to nearby security, and could be emitted from mobile device itself and/or external system speakers. Additional security measures might involve the memory of mobile device being erased, such that reverse engineering could not take place at some uncontrolled location.

As will be appreciated, the task of limiting play of a mobile gaming device to a particular "authorized" gaming zone using radio frequency, as opposed to near field magnetic induction, may involve a number of considerations given the typical RF hostile casino environment. One method of determining location could involve the implementation of a number of "pico cells." As is generally known, such pico cells can comprise wireless system access points having a limited amount of power and range. Such limited power and range can be compensated for by using a large number of pico cells, with the overall result being that tighter controls can be had with respect to the exact shape and size of a defined restricted area. Whereas more powerful access points might emit signals that could be detected and used at significant distances, pico cells tend to have such a limited range that detection or communication at distances of more than a few feet or yards might not be possible. Of course, pico cell signal strength and receiver sensitivity on mobile device could also be controlled, such that a definite operational range for the pico cells could be set. Once set, mobile device would then be operable with respect to gaming only when it is able to detect a signal from a system pico cell. Once mobile device is moved from an authorized zone, resulting in no pico cells being within a few feet or yards of mobile device, then no pico cell signal could be heard, and gaming on mobile device could be suspended or terminated.

Figure 8A:
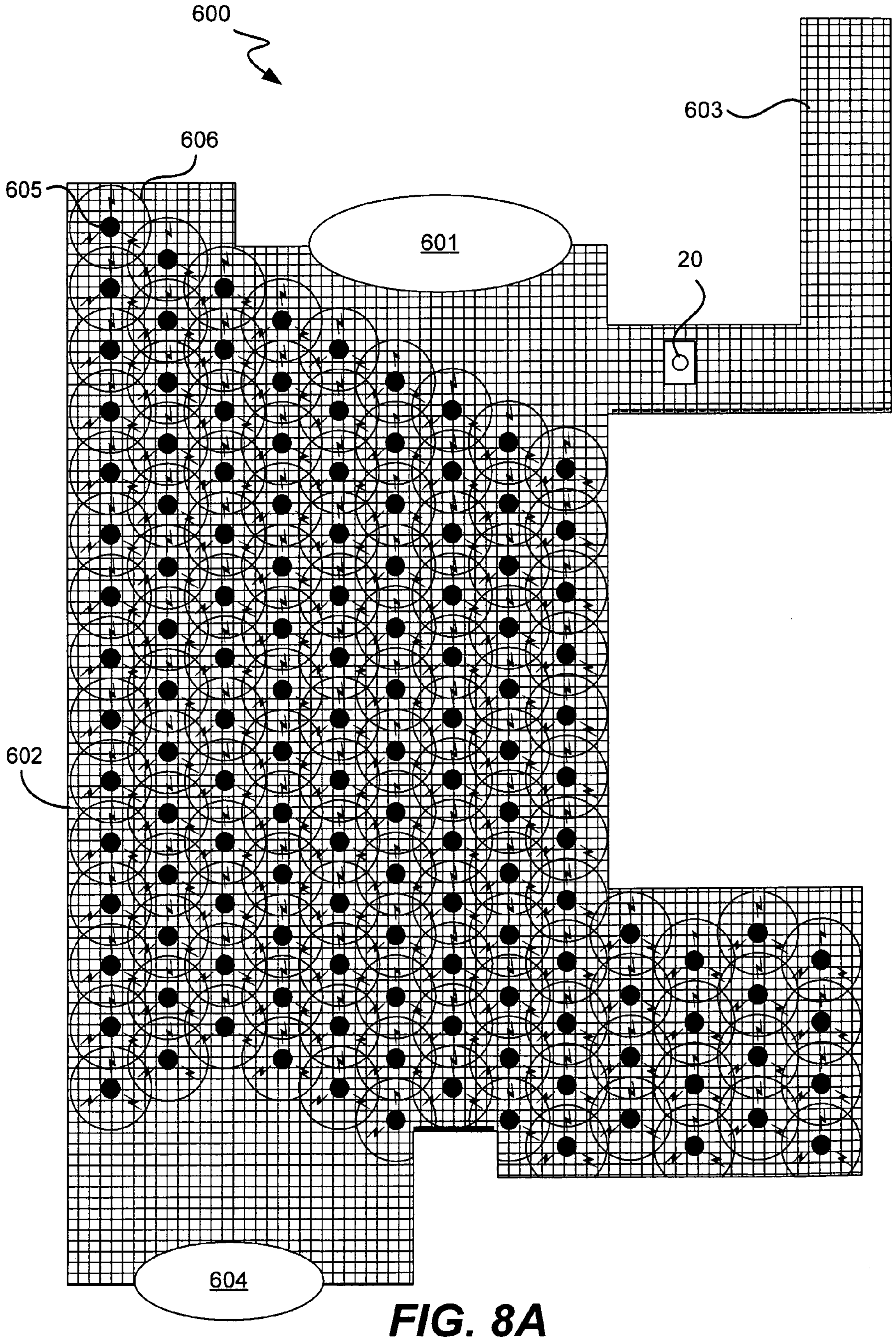
FIG. 8A is a of a top-plan view of a casino floor layout having at least one mobile gaming device and multiple virtual leash terminals in a radio frequency (RF) implementation in accordance with one embodiment of the invention.

Referring now to FIG. 8A, a second exemplary casino and hotel floor layout having at least one mobile gaming device and multiple virtual leash terminals in the form of pico cells in accordance with one embodiment of the present invention is illustrated in top plan view. Casino 600 can include various items in its floor layout, such as, for example, a main or primary entrance region 601, a main or primary gaming floor 602 adapted for the play of wager based games, a hallway or other passageway 603 to an associated hotel or set of elevators to hotel facilities, and an entrance region 604 to a restaurant, shop or other affiliated enterprise within the casino, among other items. Of course, many other floor layout items and types of items may exist, and it will be understood that only a few are being shown for purposes of illustration in the present example. As described with respect to FIGS. 1 and 2A, there can be locations and areas within casino 600 that are gaming appropriate and others that are not. For example, in FIG. 8A much of primary gaming floor 602 will be gaming appropriate, with many gaming machines, gaming tables and other types of gaming devices and activities taking place. Areas where gaming might not be appropriate or legal can include those regions near entryways, such as entryways 601 and 604, as well as hallways or passageways to other non-gaming areas, such as hotel passageway 603. In particular, various legal statutes or rules might require that gaming not take place within a given distance of an entryway to a store or restaurant where children are accepted and may be present, such as a restaurant entry 604.

As such, a plurality of pico cells 605 can be established within casino 600 in and about areas where gaming activities may be legally conducted, such as most of primary gaming floor 602. Each pico cell 605 can have a limited short range, denoted as perimeter 606, within which signals emitted from the pico cell can be detected by a mobile gaming device, such as mobile gaming device 20. By strategically placing a plurality of pico cells in a particular manner, a casino or other gaming establishment can create an overall region where mobile gaming devices are able to pick up a signal from at least one system pico cell, and thus be operational with respect to wager based gaming. As shown in FIG. 8A, this region for casino 600 corresponds to all areas falling with the range perimeter 606 of any of the pico cells 605. Where a mobile gaming device is not within any such range perimeter of a pico cell, it should not pick up a pico cell signal, and thus will prevent its user from initiating or continuing a gaming session outside of the designated gaming region.

Such pico cells 605 can be established as, for example, generic wireless access points located on the ceiling or at other alternative locations on the gaming floor. In some embodiments, one or more gaming machines, gaming terminals, kiosks or other items on the gaming floor can serve as host to a pico cell. As will be readily appreciated, any given gaming machine, terminal, kiosk or the like might also be adapted in other ways to serve as a system emitter for purposes of a virtual leash function. If used to emit a virtual leash type of signal, a gaming machine might be adapted to do so via its candle, for example.

As shown in FIG. 8A, it may be desirable to orient multiple pico cells 605 such that there is some overlap with respect to the range of more than one cell. Such an overlapping design would not only prevent various "holes" in coverage that can occur where cells are spaced farther apart, but can also provide for a greater amount of backup coverage in an area in the event that a particular pico cell is lost, damaged or becomes non-functional for any reason. With respect to the illustrative exemplary mobile gaming device, this mobile gaming device 20 is actually within passageway 603, and as such is not within the range perimeter of any system pico cell. Thus, the user of mobile gaming device 20 would not be allowed to participate in gaming activities on mobile device at this location. Should the user move out of the passageway 603 and into the range 606 of at least one pico cell 605, then his or her gaming session would be allowed to start or continue. Although in the embodiment described above, pico cells are used in an RF environment, they can also be used as NFM transmitters and receivers according to the NFM communication standard described above.

An alternative method used to determine locations for mobile gaming devices involves triangulation to determine the exact physical location of each mobile gaming device within the system. As is generally known, triangulation can involve the use of three or more signal sensing and/or emitting devices, with at least three being able to detect a signal from a subject device, such as a mobile gaming device. While each signal sensing device is not by itself capable of determining a mobile gaming device or other device location, such a location can be determined by using multiple signal sensing devices. In general, each signal sensing device can typically detect the distance from itself to a subject mobile gaming device or other similar signal emitting device, such that a circle can be proscribed about a single sensing device with respect to where mobile device or other emitting device might be. By using at least three signal sensing devices, three or more such circles can be proscribed, with the intersection of all such circles defining the exact location of the emitting device. Further details of such a triangulation approach within a gaming environment can be found at, for example, commonly owned U.S. Pat. No. 6,843,725, issued to Nelson and entitled "Method And Apparatus For Monitoring Or Controlling A Gaming Machine Based On Gaming Machine Location," which is incorporated herein by reference in its entirety and for all purposes.

Figure 8B:
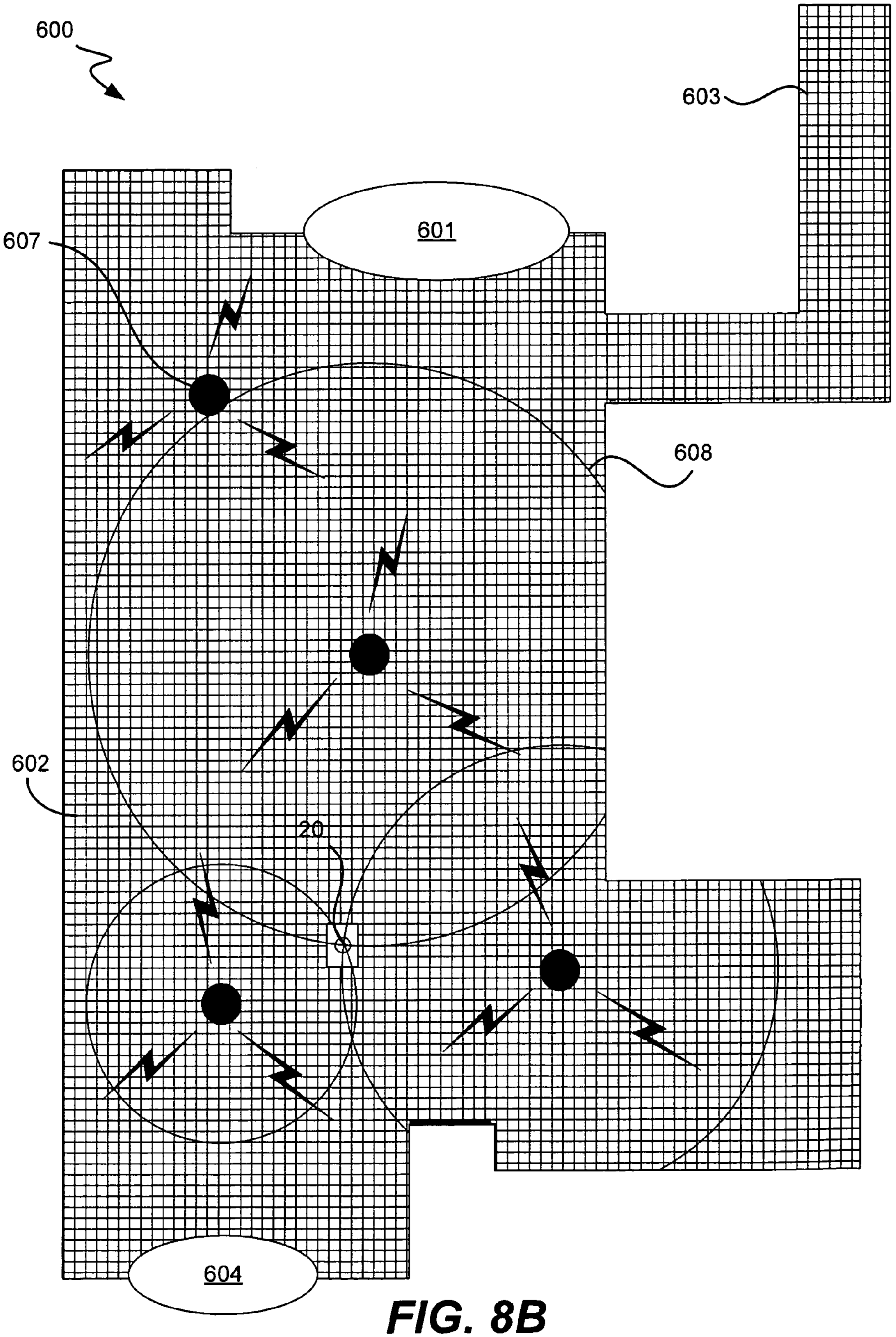
FIG. 8B is a top-plan view of a casino floor layout having a mobile gaming device and multiple virtual leash terminals in the form of triangulation devices in a RF implementation in accordance with one embodiment of the invention.

For purposes of illustration, FIG. 8B depicts in top plan view the same exemplary casino floor layout having at least one mobile gaming device present, only with multiple virtual leash terminals in the form of triangulation devices in accordance with one embodiment of the invention. Although it might be possible for casino 600 to have both pico cells and triangulation devices in the same environment or area, it is also contemplated that either form of location sensing system could be independently used. With respect to a triangulation system, at least three triangulation devices 607 can be located about the casino, preferably in strategic locations based on the shape of the casino floor plan and designated permissible gaming regions. Such triangulation devices could be in the form of wireless system access points atop towers or coupled to the ceiling above the gaming floor. Alternatively, as in the pico cell embodiment above, such triangulation devices could be hosted at one or more gaming machines, terminals, or kiosks. Unlike the pico cell embodiment above, a given mobile gaming device would not necessarily be operable for wager based gaming purposes just because it might detect a signal from a triangulation device 607 at the casino. Rather, each triangulation device 607 would be adapted to determine the distance between itself and a given mobile gaming device, such as by reading a signal from mobile device at the triangulation device.

To any single triangulation device, such a distance could be recognized as any possible location residing along a distance perimeter 608 from the triangulation device. Of course, locations outside of the casino floor plan might not be included as possible mobile gaming device locations, as is shown. Once a distance perimeter for a given mobile gaming device, such as mobile gaming device 20, is established for two different triangulation devices 607, then one or at most two possible locations would be possible for mobile device 20. In some instances, a third triangulation device will become necessary to pinpoint the exact location of a given mobile gaming device. As illustrated, the distance perimeters 608 of three different triangulation devices 607 have been used to pinpoint the location of mobile gaming device 20 as being near the entrance 604 of an associated restaurant, but not so close as to prohibit gaming activity at mobile device 20 at its present location. It should be appreciated that distance perimeter 608 does not represent a range for a triangulation device 607. Rather, the range for each such triangulation device can be quite far, even extending to many or all locations and distances on the casino floor. Such ranges are not illustrated.

One advantage to using such a triangulation approach is that mobile gaming devices that might be outside a legitimate gaming area but are still in wireless communication with one or more system devices can still be prevented from conducting gaming activities while outside the legitimate gaming area. Since the signal detection range is significantly larger by design, the system is adapted to determine exact mobile gaming device locations and act accordingly. In some embodiments, a "yes" or "no" signal can be sent to a given mobile gaming device based on its detected location within the system. Each mobile gaming device could then be adapted to prevent, suspend, and/or terminate a gaming session whenever it is outside of an approved gaming area, based on the "yes" or "no" signal being sent from the system. In addition to the foregoing, other suitable specific location sensing methods might also be adopted for use with the overall mobile gaming device based gaming system, with such specific location sensing methods including, for example, WiFi position sensing, RF Fingerprinting (such as at https://www.ekahau.com), time difference of arrival ("TDOA"), and active RF tags, among others.

Still another form of virtual leash can be created with respect to the actual mobile gaming device itself, such that verification can be made that the device attempting to play games is a proper device for the overall wireless and virtual leash system. Such a leash can be created using a variety of different identifying devices. For example, specially coded RFID tags can be installed within or attached to each mobile gaming device, with such RFID tags being registered on the system. In this manner, every duly registered and authorized mobile gaming device, whether it be casino owned or privately owned, can have its own separate identifier that is recognizable by the system. Of course, other types and forms of identifying devices can be used as well. For example, a specialized dongle, E-key, USB peripheral, or other attachment might be required to be attached to mobile device for gaming to begin or continue. Such a dongle, E-key, USB peripheral or other attachment might also have a specific identifier that positively identifies and individuates its associated mobile gaming device. The specific identifier could then be read by the system as part of a virtual leash process, particularly where it may be desirable to determine the exact identity of a given mobile gaming device or set of mobile gaming devices.

Alternatively, or in addition to any of the foregoing physical devices, an identification certificate or other form of electronic identification may be stored on a mobile device. Such a transaction certificate or other form of electronic identification could be added as part of an original registration or first command download process, and could remain on a mobile device as an unalterable file. Any removal or deletion of the file, such as where an unalterable identifier file might be downloaded to and ultimately removed or deleted from a privately owned mobile gaming device, would then result in a need to re-register the device or otherwise download a new file containing a new digital identifier. Accordingly, one part of a registration and/or command download process for mobile gaming devices that are privately owned might include the download of an unalterable file containing an individuating identifier, such that the device can be specifically identified by the system at some later time.

Still further forms of virtual leashes can be created with respect to any particular software module or program downloaded to mobile device for use in the wireless gaming system. Various software modules and programs may contain a short portion of code that identifies the module or program, and such identifying portions may be encrypted or otherwise secured, such that improper or fraudulent identifications or transactions are hindered or prevented. Using such items, one or more critical software programs or modules may be required to submit such identifying codes as part of a virtual leash process, in order to ensure that not only an authorized module or program is being used, but also to ensure that an appropriate version and/or revision is also being used. For example, while one authorized version of Texas Hold'em might be appropriate for use in Nevada, that same version might be improper or illegal in another gaming jurisdiction, such as in New Jersey or Monaco. In cases where a privately owned mobile gaming device has an authorized and appropriate game version downloaded to it in one jurisdiction, this version would have to be verified as appropriate in that same or any other jurisdiction before it is used again at some later time, assuming it is not deleted by the user or otherwise.

A "transaction certificate" can also be created with respect to one or more software components or codes that might be stored on a given mobile gaming device, whether casino owned or privately owned. Such a transaction certificate could also be made a part of the virtual leash process, with one or more certificate items being verified before gaming using that portion of code is initiated or permitted to continue. Such transaction certificate items could relate to, for example, the software version and/or revision for any given software module or program, the types of games downloaded, any specific game downloaded, a casino identifier, an identifier with respect to an owner, player or group of owners or players for mobile device, a time stamp, transaction data regarding any games or game seeds downloaded (e.g., game title, game type, number of seeds, money paid), a device identifier, and any jurisdictional requirements with respect to a particular gaming jurisdiction, such as the one where a registration or transaction using the device has taken place, among others.

Regardless of the communication standard or protocol used to transmit these data (e.g., RF, NFM, etc.), the gaming software, game play data, and other data must be stored and processed by a back-end system, similar to how game play data and software from stand-alone or server-based electronic gaming machines are processed. In another example of integration of the present invention into an existing back-end infrastructure, in other embodiments, gaming device server 502 may not be a separate server but rather inherent or incorporated in an existing back-end gaming server such as a server-based gaming server, a license manager server, or an arbiter server, to name only a few examples. In another example, mobile gaming devices may be arranged to operate in a peer-to-peer configuration where data in mobile gaming server 502 is decentralized and shared among numerous gaming devices, which may include gaming devices with gaming operator administrative capabilities. Thus, given that some embodiments of the present invention may involve close integration or at least some degree of operational connectivity with existing networks and gaming components, including conventional electronic gaming machines (or what can be referred to in the context of the present invention as "non-mobile" gaming machines), it is useful to describe the network topology of a gaming network, its various components, and an electronic gaming machine. In the following description, a gaming machine as described below may represent a conventional electronic gaming machine, a mobile gaming device, or both. Similarly, the various gaming servers described below can also be applied to mobile gaming server 502.

Figure 9A:
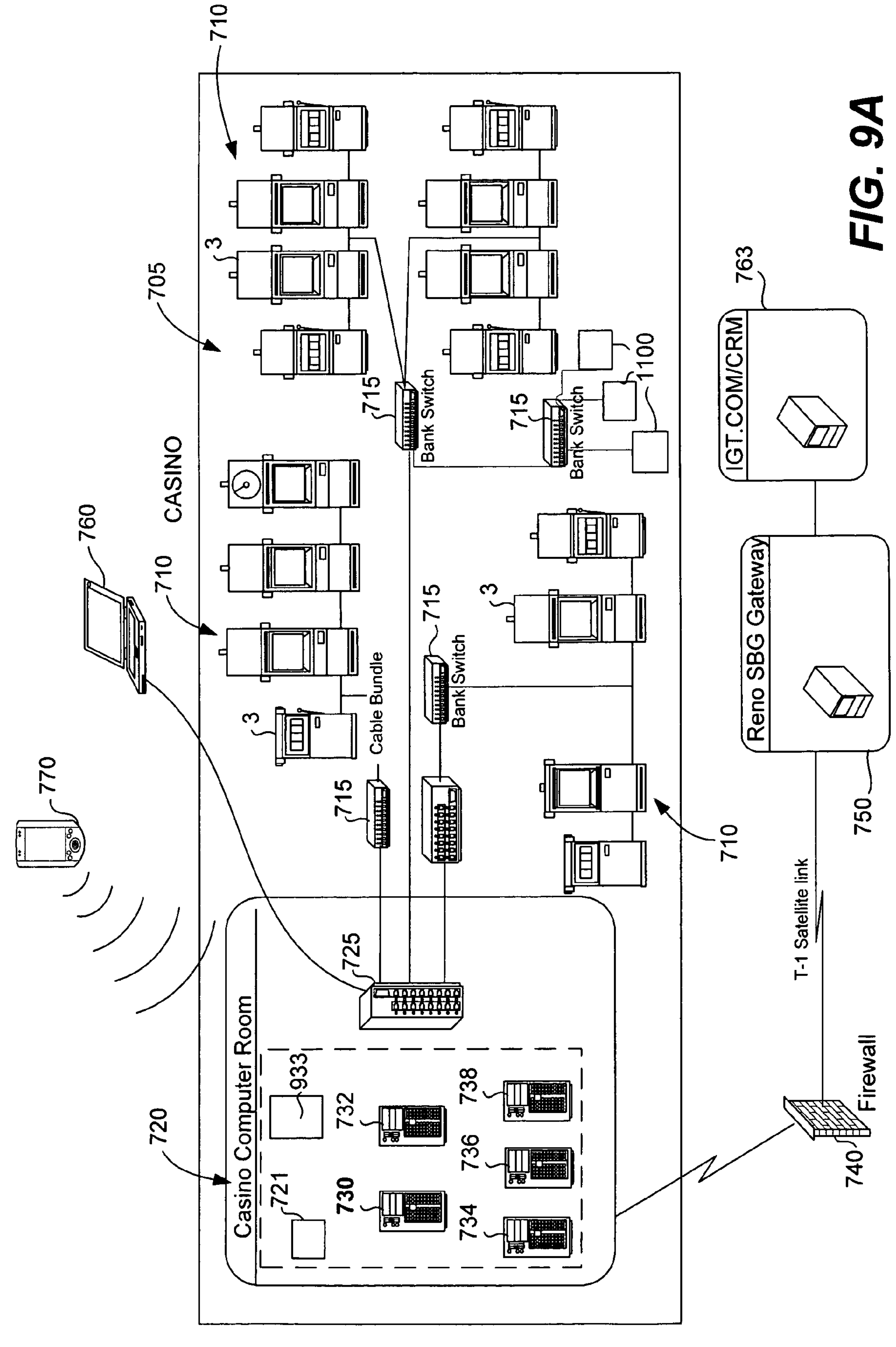
FIG. 9A is illustrates one example of a gaming network topology for implementing certain aspects of the present invention.

One example of a network topology, which includes network connections 315*a*, 315*b*, and 316 of FIG. 3, for implementing some aspects of the present invention is shown in FIG. 9A. Those of skill in the art will realize that this exemplary architecture and the related functionality are examples and that the present invention encompasses many other such embodiments and methods.

In one embodiment, gaming data are transferred between a gaming server and gaming machine, a mobile gaming device, or any two gaming devices using a satellite connection. A gaming machine or mobile gaming device using a satellite communication system is connected to a satellite dish. For instance, a gaming machine located in a store or a cruise ship may use a satellite connection. Standard coaxial cables may connect the gaming machine or device to the satellite dish. The gaming machine may include a satellite modem to enable the satellite connection.

A satellite dish may send requests to the Internet and receive Internet content via the satellite. The satellite, in turn, may communicate with a hub facility, which has a direct connection with the Internet. Typically, the transfer rate of information from a gaming device, such as a gaming machine or a mobile gaming device, to a satellite, referred to as the uplink rate, is less than the transfer of rate of information from a satellite to the gaming machine (downlink rate). For example, an uplink rate may be 28 kB per second while the downlink rate may be 500 kB per second or higher. However, for software downloads, a high downlink rate may only be required for efficient gaming module downloads. Satellite Internet services are commercially available, for example, from Starband Corporation of Mclean, Va.

In another embodiment, gaming data are transferred between a gaming server and gaming machine using a radio frequency connection. As one example, US Telemetry Corporation of Dallas, Tex., uses radio frequency transmissions in the 218-222 MHz band to provide communications services to fixed end point devices as well as mobile devices. The fixed end point device may be a gaming machine located in a store or located in a casino, as well as a mobile gaming device such as a gaming machine located in a riverboat or portable gaming device that may be carried by a player and used to play a wagering game.

Returning to FIG. 9A, a single gaming establishment 705, in this case a casino, is illustrated. However, it should be understood that some implementations of the present invention involve multiple gaming establishments.

Gaming establishment 705 includes 16 gaming machines 3, each of which is part of a bank 710 of gaming machines 3. In this example, gaming establishment 705 also includes a bank of networked gaming tables 1100. Gaming establishment 705 may have one or more zones and enable the use of mobile gaming devices via near-field magnetic antennas, hubs (or base stations), and portable gaming device servers (not shown) It will be appreciated that many gaming establishments include hundreds or even thousands of gaming machines 3 and/or gaming tables 1100, not all of which are included in a bank. However, the present invention may be implemented in gaming establishments having any number of gaming machines.

Various alternative network topologies can be used to implement different aspects of the invention and/or to accommodate varying numbers of networked devices. For example, gaming establishments with very large numbers of gaming machines 3 may require multiple instances of some network devices (e.g., of main network device 725, which combines switching and routing functionality in this example) and/or the inclusion of other network devices not shown in FIG. 9A. For example, some implementations of the invention may include one or more middleware servers disposed between gaming machines 3 and server 730. Such middleware servers can provide various useful functions, including but not limited to the filtering and/or aggregation of data received from bank switches 710, from individual gaming machines and from other player terminals. Some implementations of the invention include load balancing methods and devices for managing network traffic.

Each bank 710 has a corresponding bank switch 715, which may be a conventional bank switch. Each bank switch is connected to server-based gaming ("SBG") server 730 via main network device 725, which combines switching and routing functionality in this example. Although various floor communication protocols may be used, some preferred implementations use an open, Ethernet-based SuperSAS® protocol developed by IGT of Reno, Nev. and is available for downloading without charge. However, other protocols such as Best of Breed ("BOB") may be used to implement various aspects of SBG. IGT has also developed a gaming-industry-specific transport layer called CASH that executes on top of TCP/IP and offers additional functionality and security.

SBG server 730, License Manager 721, Arbiter 933, server 732, 734, 736, and 738, and main network device 725 are disposed within computer room 720 of gaming establishment 705. License Manager 721 may be implemented, at least in part, via a server or a similar device. Some exemplary operations of License Manager 721 are described in detail in U.S. patent application Ser. No. 11/225,408 IGT1P253), entitled "METHODS AND DEVICES FOR AUTHENTICATION AND LICENSING IN A GAMING NETWORK" by Kinsley et al., which is hereby incorporated by reference.

SBG server 730 can be configured to implement, at least in part, various aspects of the present invention. Some preferred embodiments of SBG server 730 and other servers shown in FIG. 9A include (or are at least in communication with) clustered CPUs, redundant storage devices, including backup storage devices, switches, etc. Such storage devices may include a redundant array of inexpensive disks ("RAID"), back-up hard drives and/or tape drives, etc. Preferably, a Radius and a DHCP server are also configured for communication with the gaming network. Some implementations of the invention provide one or more of these servers in the form of blade servers.

In some implementations of the invention, many of these devices (including but not limited to License Manager 721, servers 732, 734, 736, and 738, and main network device 725) are mounted in a single rack with SBG server 730. Accordingly, many or all such devices are sometimes referenced in the aggregate as an "SBG server." However, in alternative implementations, one or more of these devices is in communication with SBG server 730 but located elsewhere. For example, some of the devices could be mounted in separate racks within computer room 720 or located elsewhere on the network. For example, it can be advantageous to store large volumes of data elsewhere via a storage area network ("SAN").

In some embodiments, these components of SBG server 730 preferably have an uninterruptible power supply ("UPS"). The UPS may be, for example, a rack-mounted UPS module.

Computer room 720 may include one or more operator consoles or other host devices that are configured for communication with SBG server 730 and with mobile gaming devices, NFM components, such as antennas, RF transmitters, and NFM and RF hubs. Such host devices may be provided with software, hardware and/or firmware for implementing various aspects of the invention; many of these aspects involve controlling SBG server 730. However, such host devices need not be located within computer room 720. Wired host device 760 (which is a laptop computer in this example) and wireless host device 770 (which is a PDA in this example) may be located elsewhere in gaming establishment 705 or at a remote location. Such a wireless host device can also include gaming device 20.

Arbiter 933 may be implemented, for example, via software that is running on a server or another networked device. Arbiter 933 serves as an intermediary between different devices on the network. Some implementations of Arbiter 933 are described in U.S. patent application Ser. No. 10/948,387, entitled "METHODS AND APPARATUS FOR NEGOTIATING COMMUNICATIONS WITHIN A GAMING NETWORK" and filed Sep. 23, 2004 (the "Arbiter Application"), which is incorporated herein by reference and for all purposes. In some preferred implementations, Arbiter 933 is a repository for the configuration information required for communication between devices on the gaming network (and, in some implementations, devices outside the gaming network). Although Arbiter 933 can be implemented in various ways, one exemplary implementation is discussed below.

Figure 9B:
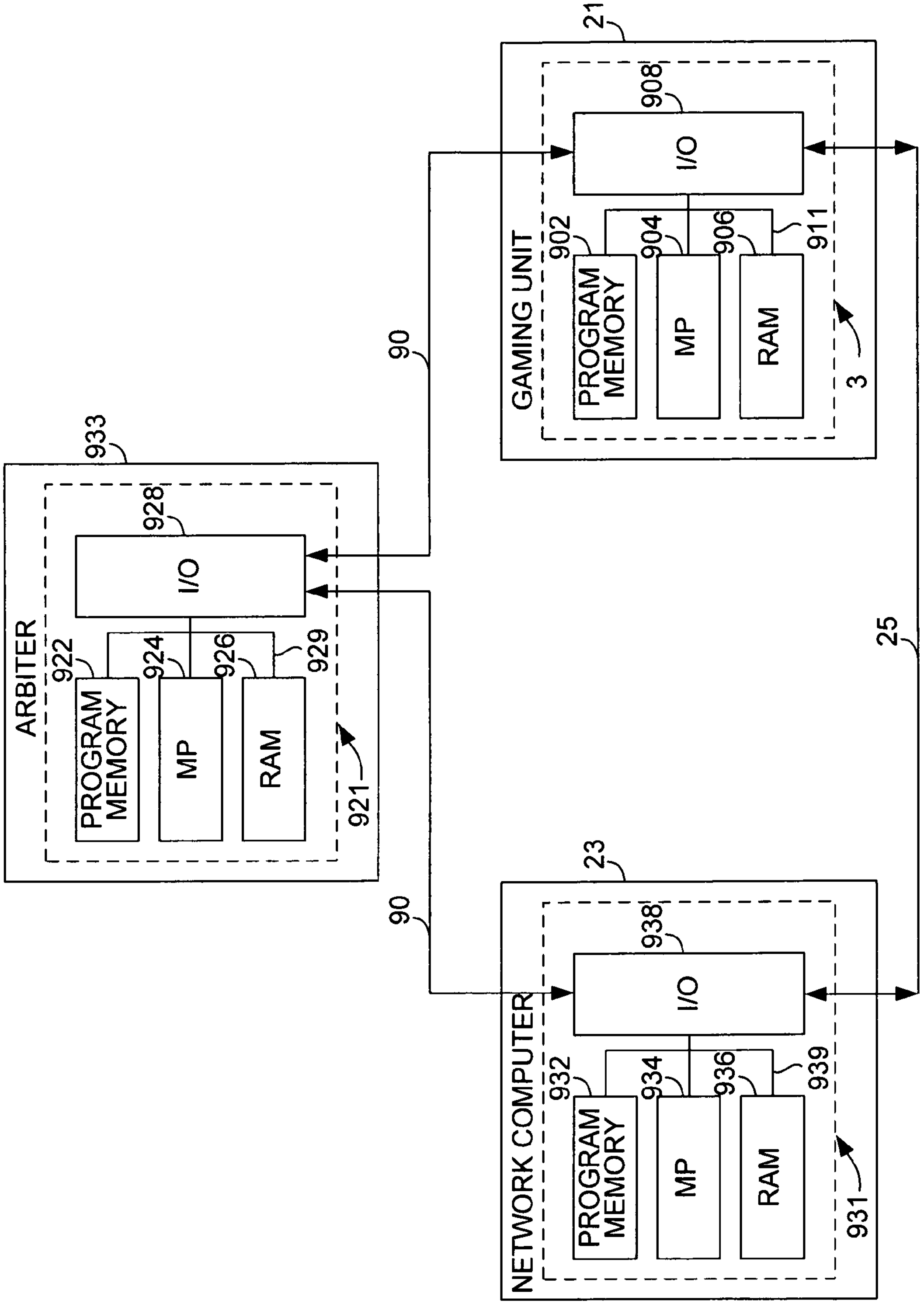
FIG. 9B is a block diagram illustrating a simplified gaming network topology for implementing an arbiter in a gaming network of the present invention.

FIG. 9B is a block diagram of a simplified communication topology between a gaming unit and machine 21, the network computer 23 and the Arbiter 933. Although only one gaming unit 21, one network computer 23 and one Arbiter 933 are shown in FIG. 7B, it should be understood that the following examples may be applicable to different types of network gaming devices within the gaming network beyond the gaming unit 21 and the network computer 23, and may include different numbers of network computers, gaming security arbiters and gaming units. For example, a single Arbiter 933 may be used for secure communications among a plurality of network computers 23 and tens, hundreds or thousands of gaming units 21. Likewise, multiple gaming security arbiters 46 may be utilized for improved performance and other scalability factors.

Referring to FIG. 9B, Arbiter 933 may include an arbiter controller 921 that may comprise a program memory 922, a microcontroller or microprocessor (MP) 924, a random-access memory (RAM) 926 and an input/output (I/O) circuit 928, all of which may be interconnected via an address/data bus 929. Network computer 23 may also include a controller 931 that may comprise a program memory 932, a microcontroller or microprocessor (MP) 934, a random-access memory (RAM) 936 and an input/output (I/O) circuit 938, all of which may be interconnected via an address/data bus 939. It should be appreciated that although the Arbiter 933 and the network computer 23 are each shown with only one microprocessor 924, 934, the controllers 921, 931 may each include multiple microprocessors 924, 934. Similarly, the memory of the controllers 921, 931 may include multiple RAMs 926, 936 and multiple program memories 922, 932. Although the I/O circuits 928 and 938 are each shown as a single block, it should be appreciated that the I/O circuits 928 and 938 may include a number of different types of I/O circuits. RAMs 924 and 934 and program memories 922 and 932 may be implemented as semiconductor memories, magnetically readable memories, and/or optically readable memories, for example.

Although the program memories 922, 932 are shown in FIG. 9B as read-only memories (ROM) 922, 932, the program memories of the controllers 921, 931 may be a read/write or alterable memory, such as a hard disk. In the event a hard disk is used as a program memory, the address/data buses 929, 939 shown schematically in FIG. 9B may each comprise multiple address/data buses, which may be of different types, and there may be an I/O circuit disposed between the address/data buses.

As shown in FIG. 9B, the gaming unit 21 may be operatively coupled to the network computer 23 via the data link 25. The gaming unit 21 may also be operatively coupled to the Arbiter 933 via the data link 90, and the network computer 23 may likewise be operatively coupled to the Arbiter 933 via the data link 90. Communications between the gaming unit 21 and the network computer 23 may involve different information types of varying levels of sensitivity resulting in varying levels of encryption techniques depending on the sensitivity of the information. For example, communications such as drink orders and statistical information may be considered less sensitive. A drink order or statistical information may remain encrypted, although with moderately secure encryption techniques, such as RC4, resulting in less processing power and less time for encryption. On the other hand, financial information (e.g., account information, winnings, etc.), game download information (e.g., game software and game licensing information) and personal information (e.g., social security number, personal preferences, etc.) may be encrypted with stronger encryption techniques such as DES or 3DES to provide increased security.

As disclosed in further detail in the Arbiter Application, Arbiter 933 may verify the authenticity of each network gaming device. Arbiter 933 may receive a request for a communication session from a network device. For ease of explanation, the requesting network device may be referred to as the client, and the requested network device may be referred to as the host. The client may be any device on the network 705 and the request may be for a communication session with any other network device. The client may specify the host, or the gaming security arbiter may select the host based on the request and based on information about the client and potential hosts. Arbiter 933 may provide encryption keys (session keys) for the communication session to the client via the secure communication channel. Either the host and/or the session key may be provided in response to the request, or may have been previously provided. The client may contact the host to initiate the communication session. The host may then contact Arbiter 933 to determine the authenticity of the client. Arbiter 933 may provide affirmation (or lack thereof) of the authenticity of the client to the host and provide a corresponding session key, in response to which the network devices may initiate the communication session directly with each other using the session keys to encrypt and decrypt messages.

Alternatively, upon receiving a request for a communication session, Arbiter 933 may contact the host regarding the request and provide corresponding session keys to both the client and the host. Arbiter 933 may then initiate either the client or the host to begin their communication session. In turn, the client and host may begin the communication session directly with each other using the session keys to encrypt and decrypt messages. An additional explanation of the communication request, communication response and key distribution is provided in the Arbiter Application.

Wireless devices are particularly useful for managing a gaming network. Such wireless devices could include, but are not limited to, laptops, PDAs, tablet PCs, or even cellular telephones. Referring once again to FIG. 9A, one or more network devices in gaming establishment 705 can be configured as wireless access points. For example, a casino manager may use a wireless handheld device to revise and/or schedule gaming machine configurations while roaming the casino floor. Similarly, a representative of a regulatory body could use a PDA to verify gaming machine configurations, generate reports, view activity logs, etc., while on the casino floor.

If a host device is located in a remote location, security methods and devices (such as firewalls, authentication and/or encryption) should be deployed in order to prevent the unauthorized access of the gaming network. Similarly, any other connection between gaming network 705 and the outside world should only be made with trusted devices via a secure link, e.g., via a virtual private network ("VPN") tunnel. For example, the connection between SBG 730, firewall 740, gateway 750 and central system 763 (here, IGT.com) that may be used for game downloads, etc., is advantageously made via a VPN tunnel.

An Internet-based VPN uses the open, distributed infrastructure of the Internet to transmit data between sites. A VPN may emulate a private TCP/IP network over public or shared infrastructures. A VPN that supports only IP traffic is called an IP-VPN. VPNs provide advantages to both the service provider and its customers. For its customers, a VPN can extend the IP capabilities of a corporate site to remote offices and/or users with intranet, extranet, and dial-up services. This connectivity may be achieved at a lower cost to the gaming entity with savings in capital equipment, operations, and services. Details of VPN methods that may be used with the present invention are described in the reference, "Virtual Private Networks-Technologies and Solutions," by R. Yueh and T. Strayer, Addison-Wesley, 2001, ISBN#0-201-70209-6, which is incorporated herein by reference and for all purposes.

There are many ways in which IP VPN services may be implemented, such as, for example, Virtual Leased Lines, Virtual Private Routed Networks, Virtual Private Dial Networks, Virtual Private LAN Segments, etc. Additionally VPNs may be implemented using a variety of protocols, such as, for example, IP Security (IPSec) Protocol, Layer 2 Tunneling Protocol, Multiprotocol Label Switching (MPLS) Protocol, etc. Details of these protocols, including RFC reports, may be obtained from the VPN Consortium, an industry trade group (http://www.vpnc.com, VPNC, Santa Cruz, Calif.).

For security purposes, any information transmitted to or from a gaming establishment over a public network may be encrypted. In one implementation, the information may be symmetrically encrypted using a symmetric encryption key, where the symmetric encryption key is asymmetrically encrypted using a private key. The public key may be obtained from a remote public key server. The encryption algorithm may reside in processor logic stored on the gaming machine. When a remote server receives a message containing the encrypted data, the symmetric encryption key is decrypted with a private key residing on the remote server and the symmetrically encrypted information sent from the gaming machine is decrypted using the symmetric encryption key. A different symmetric encryption key is used for each transaction where the key is randomly generated. Symmetric encryption and decryption is preferably applied to most information because symmetric encryption algorithms tend to be 100-10,000 faster than asymmetric encryption algorithms.

As mentioned elsewhere herein, U.S. patent application Ser. No. 11/225,408, entitled "METHODS AND DEVICES FOR AUTHENTICATION AND LICENSING IN A GAMING NETWORK" by Kinsley et al., describes novel methods and devices for authentication, game downloading and game license management. This application has been incorporated herein by reference.

Providing a secure connection between the local devices of the SBG system and IGT's central system allows for the deployment of many advantageous features. For example, a customer (e.g., an employee of a gaming establishment) can log onto an account of central system 763 (in this example, IGT.com) to obtain the account information such as the customer's current and prior account status.

Moreover, such a secure connection may be used by the central system 763 to collect information regarding a customer's system. Such information includes, but is not limited to, error logs for use in diagnostics and troubleshooting. Some implementations of the invention allow a central system to collect other types of information, e.g., information about the usage of certain types of gaming software, revenue information regarding certain types of games and/or gaming machines, etc. Such information includes, but is not limited to, information regarding the revenue attributable to particular games at specific times of day, days of the week, etc. Such information may be obtained, at least in part, by reference to an accounting system of the gaming network(s), as described in U.S. patent application Ser. No. 11/225,407, by Wolf et al., entitled "METHODS AND DEVICES FOR MANAGING GAMING NETWORKS," which has been incorporated herein by reference.

Automatic updates of a customer's SBG server may also be enabled. For example, central system 763 may notify a local SBG server regarding new products and/or product updates. For example, central system 763 may notify a local SBG server regarding updates of new gaming software, gaming software updates, peripheral updates, the status of current gaming software licenses, etc. In some implementations of the invention, central system 763 may notify a local SBG server (or another device associated with a gaming establishment) that an additional theme-specific data set and/or updates for a previously-downloaded global payout set are available. Alternatively, such updates could be automatically provided to the local SBG server and downloaded to networked gaming machines.

After the local SBG server receives this information, it can identify relevant products of interest. For example, the local SBG server may identify gaming software that is currently in use (or at least licensed) by the relevant gaming entity and send a notification to one or more host devices, e.g., via email. If an update or a new software product is desired, it can be downloaded from the central system. Some relevant downloading methods are described elsewhere herein and in applications that have been incorporated herein by reference, e.g., in U.S. patent application Ser. No. 11/078,966. Similarly, a customer may choose to renew a gaming software license via a secure connection with central system 763 in response to such a notification.

Secure communication links allow notifications to be sent securely from a local SBG server to host devices outside of a gaming establishment. For example, a local SBG server can be configured to transmit automatically generated email reports, text messages, etc., based on predetermined events that will sometimes be referred to herein as "triggers." Such triggers can include, but are not limited to, the condition of a gaming machine door being open, cash box full, machine not responding, verification failure, etc.

In addition, providing secure connections between different gaming establishments can enable alternative implementations of the invention. For example, a number of gaming establishments, each with a relatively small number of gaming machines, may be owned and/or controlled by the same entity. In such situations, having secure communications between gaming establishments makes it possible for a gaming entity to use a single SBG server as an interface between central system 763 and the gaming establishments.

Figure 10:
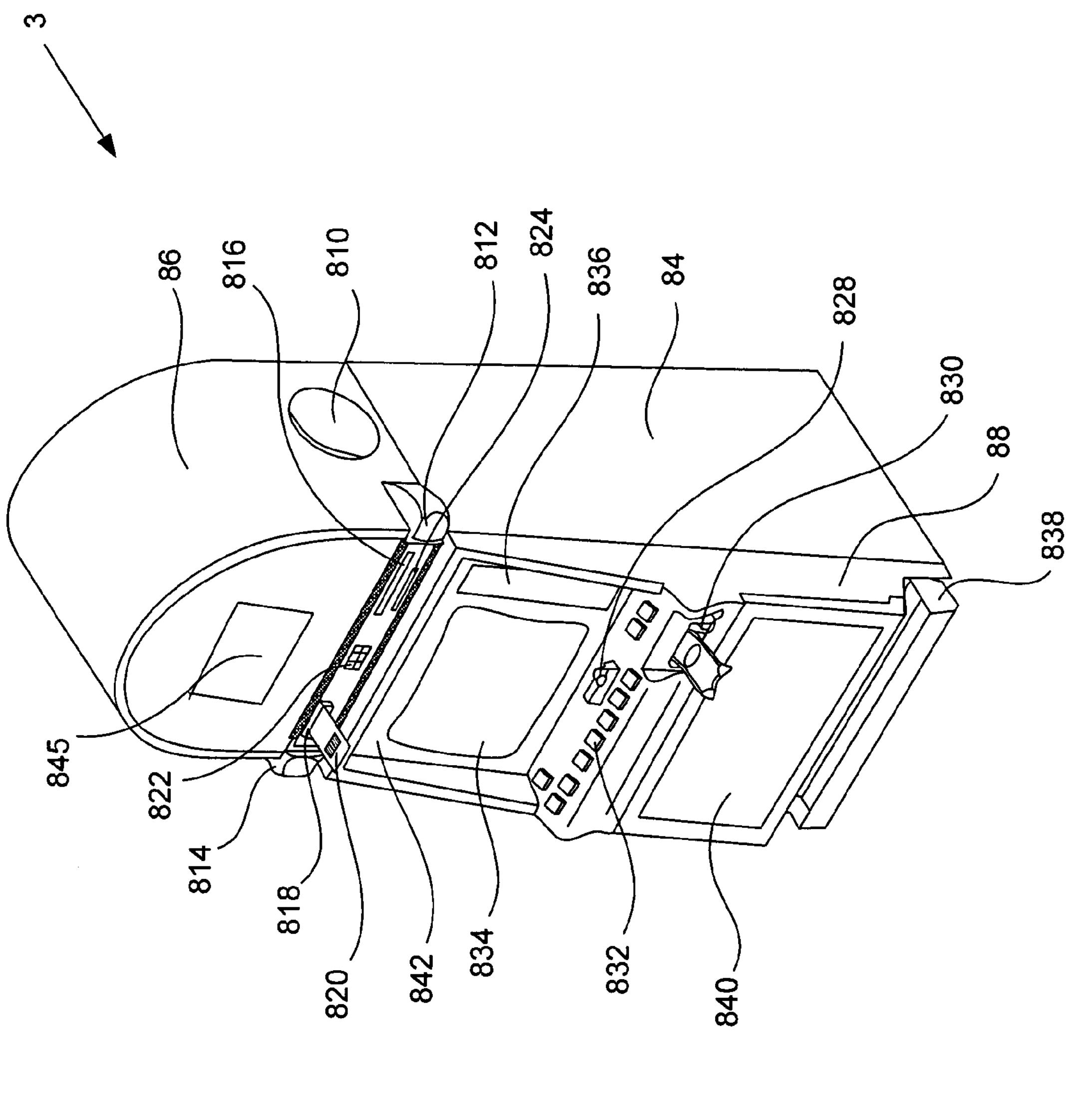
FIG. 10 is a perspective drawing of a free-standing gaming machine and its external components and features.

FIG. 10 is a perspective view of an electronic gaming machine. Components and modules of a gaming machine 3 may have equivalents in a mobile gaming device. For example, a mobile gaming device may have a software-enabled module equivalent of a physical component in gaming machine 3. In some cases, components of machine 3 such as coin hoppers, coin tray, and bill validator, are not needed or not practicable to include with a mobile gaming device. Gaming machine 3 includes a main cabinet 84, which generally surrounds the machine interior (not shown) and is viewable by users. The main cabinet includes a main door 88 on the front of the machine, which opens to provide access to the interior of the machine. Attached to the main door are player-input switches or buttons 832, a coin acceptor 828, and a bill validator 830, a coin tray 838, and a belly glass 840. Viewable through the main door is a video display monitor 834 and an information panel 836. The display monitor 834 will typically be a cathode ray tube, high resolution flat-panel LCD, or other conventional electronically controlled video monitor. The information panel 836 may be a back-lit, silk screened glass panel with lettering to indicate general game information including, for example, a game denomination (e.g. $0.25 or $1). The bill validator 830, player-input switches 832, video display monitor 834, and information panel are devices used to play a game on the game machine 3. The devices are controlled by circuitry (e.g., the master gaming controller) housed inside the main cabinet 84 of the machine 3.

As described above, many different types of games, including mechanical slot games, video slot games, video poker, video black jack, video pachinko and lottery, may be provided with gaming machines of this invention. In particular, the gaming machine 3 may be operable to provide play of many different instances of wagering games of chance. The instances may be differentiated according to themes, sounds, graphics, type of game (e.g., slot game vs. card game), denomination, number of paylines, maximum jackpot, progressive or non-progressive, bonus games, etc. The gaming machine 3 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

The gaming machine 3 includes a top box 86, which sits on top of the main cabinet 84. The top box 86 houses a number of devices, which may be used to add features to a game being played on the gaming machine 3, including speakers 810, 812, 814, a ticket printer 818 which prints bar-coded tickets 820, a key pad 822 for entering player tracking information, a florescent display 816 for displaying player tracking information, a card reader 824 for entering a magnetic striped card containing player tracking information, and a video display screen 845. The ticket printer 818 may be used to print tickets for a cashless ticketing system. Further, the top box 86 may house different or additional devices than shown in FIG. 10. For example, the top box may contain a bonus wheel or a back-lit silk screened panel which may be used to add bonus features to the game being played on the gaming machine. As another example, the top box may contain a display for a progressive jackpot offered on the gaming machine. During a game, these devices are controlled and powered, in part, by circuitry (e.g., a master gaming controller) housed within the main cabinet 84 of the machine 3.

Gaming machine 3 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention, as described below, can be deployed on most any gaming machine now available or hereafter developed.

Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

It may appear that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As is well known in the field, PCs are generally not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware, software, and firmware components and architectures are utilized in gaming machines that are not typically found in general purpose computing devices, such as PCs. These components and architectures, as described below in more detail, include but are not limited to watchdog timers, voltage monitoring systems, state-based software architecture and supporting hardware, specialized communication interfaces, security monitoring and trusted memory.

A watchdog timer is normally used in IGT gaming machines to provide a software failure detection mechanism. In a normal gaming machine operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

In a preferred embodiment, gaming machines, or gaming platforms generally, are similar to computer platforms in that it is preferable that a gaming machine use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out-of-tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition is generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

A preferred method of operation for gaming machine game software of present invention is to use a state machine. Different functions of a game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, a gaming machine does not advance from a first state to a second state until critical information that allows the first state to be reconstructed is stored. This feature allows the game to recover operation to the current state of play in the event of a malfunction, loss of power, etc that occurred just prior to the malfunction. After the state of the gaming machine is restored during the play of a game of chance, game play may resume and the game may be completed in a manner that is no different than if the malfunction had not occurred. Typically, battery-backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the time just prior to the malfunction, including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion.

Another feature of gaming machines, that they often contain unique interfaces, including serial interfaces, to connect to specific subsystems internal and external to the slot machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the slot machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming machine to a remote device. Often SAS is used in conjunction with a player tracking system.

The gaming machines of the present invention may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into a gaming machine of the present invention by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in the gaming machine to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents is a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives. A few details related to trusted memory devices that may be used in the present invention are described in U.S. Pat. No. 6,685,567 from U.S. patent application Ser. No. 09/1425,098, filed Aug. 8, 2001 and titled "PROCESS VERIFICATION," which is incorporated herein in its entirety and for all purposes.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, gaming machines that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Returning to the example of FIG. 10, when a user wishes to play gaming machine 3, he or she inserts cash through the coin acceptor 828 or bill validator 830. Additionally, the bill validator may accept a printed ticket voucher which may be accepted by the bill validator 830 as an indicia of credit when a cashless ticketing system is used. At the start of the game, the player may enter player tracking information using the card reader 824, the keypad 822, and the florescent display 816. Further, other game preferences of the player playing the game may be read from a card inserted into the card reader. During the game, the player views game information using the video display 834. Other game and prize information may also be displayed in the video display screen 845 located in the top box.

During the course of a game, a player may be required to make a number of decisions, which affect the outcome of the game. For example, a player may vary his or her wager on a particular game, select a prize for a particular game selected from a prize server, or make game decisions that affect the outcome of a particular game. The player may make these choices using the player-input switches 832, the video display screen 834 or using some other device which enables a player to input information into the gaming machine. In some embodiments, the player may be able to access various game services such as concierge services and entertainment content services using the video display screen 834 and one more input devices.

During certain game events, the gaming machine 3 may display visual and auditory effects that can be perceived by the player. These effects add to the excitement of a game, which makes a player more likely to continue playing. Auditory effects include various sounds that are projected by the speakers 810, 812, 814. Visual effects include flashing lights, strobing lights or other patterns displayed from lights on the gaming machine 3 or from lights behind the belly glass 840. After the player has completed a game, the player may receive game tokens from the coin tray 838 or the ticket 820 from the printer 818, which may be used for further games or to redeem a prize. Further, the player may receive a ticket 820 for food, merchandise, or games from the printer 818.

Figure 11:
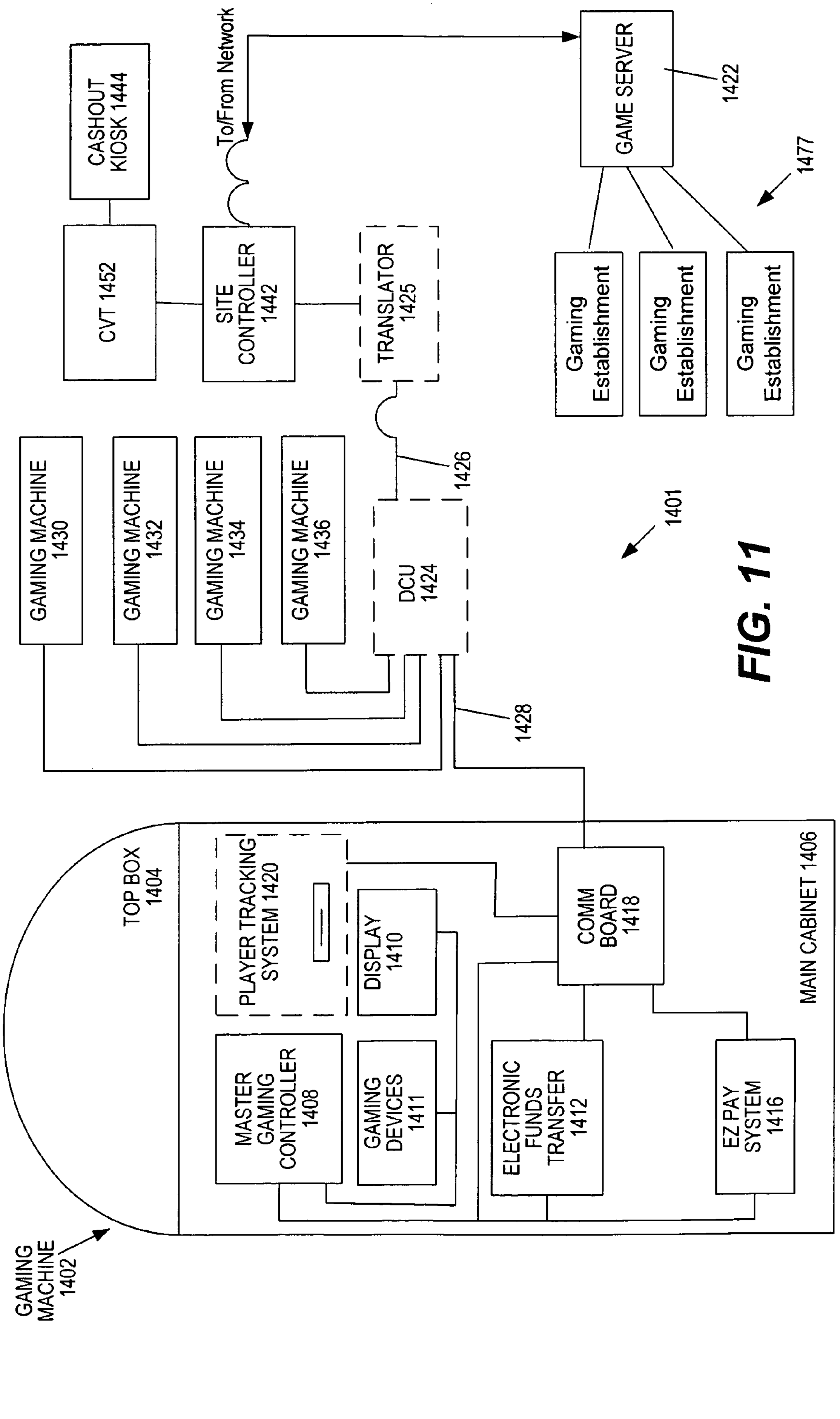
FIG. 11 is an illustration of a free-standing gaming machine and a gaming network.

An alternative gaming network that may be used to implement additional methods in accordance with other embodiments of the present invention is depicted in FIG. 11. Gaming establishment 1401 could be any sort of gaming establishment, such as a casino, a card room, an airport, a store, etc. In this example, gaming network 1477 includes more than one gaming establishment, all of which are networked to game server 1422.

Here, gaming machine 1402, and the other gaming machines 1430, 1432, 1434, and 1436, include a main cabinet 1406 and a top box 1404. The main cabinet 1406 houses the main gaming elements and can also house peripheral systems, such as those that utilize dedicated gaming networks. The top box 1404 may also be used to house these peripheral systems.

The master gaming controller 1408 controls the game play on the gaming machine 1402 according to instructions and/or game data from game server 1422 or stored within gaming machine 1402 and receives or sends data to various input/output devices 1411 on the gaming machine 1402. In one embodiment, master gaming controller 1408 includes processor(s) and other apparatus of the gaming machine systems. The master gaming controller 1408 may also communicate with a display 1410.

A particular gaming entity may desire to provide network gaming services that provide some operational advantage. Thus, dedicated networks may connect gaming machines to host servers that track the performance of gaming machines under the control of the entity, such as for accounting management, electronic fund transfers (EFTs), cashless ticketing, such as EZPay™, marketing management, and data tracking, such as player tracking. Therefore, master gaming controller 1408 may also communicate with EFT system 1412, EZPay™ system 1416 (a proprietary cashless ticketing system of the present assignee), and player tracking system 1420. The systems of the gaming machine 1402 communicate the data onto the network 1428 via a communication board 1418.

In another embodiment, mobile gaming devices are in communication with one another or with gaming machines in a peer-to-peer configuration over a suitable data network. Communications links can be established as shown between one mobile gaming device and another. One or more of the mobile gaming devices are configured to operate the same as game server, rather than coupling a separate mobile gaming server to the network. Those skilled in the art will appreciate that the software, hardware or combination thereof within one or more of the mobile gaming devices, described in greater detail below.

Gaming server or servers of the present invention can be effectively removed from the system while maintaining the same functionality. In one example, a plurality of gaming modules are distributed among the various mobile gaming devices and gaming machines. If possible, certain modules are installed on the particular mobile gaming devices where users will likely request those games. When a user requests a particular game on a given device, and that game is not already stored in memory on or accessible by the gaming device it sends a request message to other devices in the network.

It will be appreciated by those of skill in the art that embodiments of the present invention could be implemented on a network with more or fewer elements than are depicted in FIG. 11. For example, player tracking system 1420 is not a necessary feature of some implementations of the present invention. However, player tracking programs may help to sustain a game player's interest in additional game play during a visit to a gaming establishment and may entice a player to visit a gaming establishment to partake in various gaming activities. Player tracking programs provide rewards to players that typically correspond to the player's level of patronage (e.g., to the player's playing frequency and/or total amount of game plays at a given casino). Player tracking rewards may be free meals, free lodging and/or free entertainment. Moreover, player tracking information may be combined with other information that is now readily obtainable by an SBG system.

Moreover, DCU 1424 and translator 1425 are not required for all gaming establishments 1401. However, due to the sensitive nature of much of the information on a gaming network (e.g., electronic fund transfers and player tracking data) the manufacturer of a host system usually employs a particular networking language having proprietary protocols. For instance, 10-20 different companies produce player tracking host systems where each host system may use different protocols. These proprietary protocols are usually considered highly confidential and not released publicly.

Further, in the gaming industry, gaming machines are made by many different manufacturers. The communication protocols on the gaming machine are typically hard-wired into the gaming machine and each gaming machine manufacturer may utilize a different proprietary communication protocol. A gaming machine manufacturer may also produce host systems, in which case their gaming machines are compatible with their own host systems. However, in a heterogeneous gaming environment, gaming machines from different manufacturers, each with its own communication protocol, may be connected to host systems from other manufacturers, each with another communication protocol. Therefore, communication compatibility issues regarding the protocols used by the gaming machines in the system and protocols used by the host systems must be considered.

A network device that links a gaming establishment with another gaming establishment and/or a central system will sometimes be referred to herein as a "site controller." Here, site controller 1442 provides this function for gaming establishment 1401. Site controller 1442 is connected to a central system and/or other gaming establishments via one or more networks, which may be public or private networks. Among other things, site controller 1442 communicates with game server 1422 to obtain game data, such as ball drop data, bingo card data, etc.

In the present illustration, gaming machines 1402, 1430, 1432, 1434 and 1436 are connected to a dedicated gaming network 1428. In general, the DCU 1424 functions as an intermediary between the different gaming machines on the network 1428 and the site controller 1442. In general, the DCU 1424 receives data transmitted from the gaming machines and sends the data to the site controller 1442 over a transmission path 1426. In some instances, when the hardware interface used by the gaming machine is not compatible with site controller 1442, a translator 1425 may be used to convert serial data from the DCU 1424 to a format accepted by site controller 1442. The translator may provide this conversion service to a plurality of DCUs.

Further, in some dedicated gaming networks, the DCU 1424 can receive data transmitted from site controller 1442 for communication to the gaming machines on the gaming network. The received data may be, for example, communicated synchronously to the gaming machines on the gaming network.

Here, CVT 1452 provides cashless and cashout gaming services to the gaming machines in gaming establishment 1401. Broadly speaking, CVT 1452 authorizes and validates cashless gaming machine instruments (also referred to herein as "tickets" or "vouchers"), including but not limited to tickets for causing a gaming machine to display a game result and cash-out tickets. Moreover, CVT 1452 authorizes the exchange of a cashout ticket for cash. These processes will be described in detail below. In one example, when a player attempts to redeem a cash-out ticket for cash at cashout kiosk 1444, cash out kiosk 1444 reads validation data from the cashout ticket and transmits the validation data to CVT 1452 for validation. The tickets may be printed by gaming machines, by cashout kiosk 1444, by a stand-alone printer, by CVT 1452, etc. Some gaming establishments will not have a cashout kiosk 1444. Instead, a cashout ticket could be redeemed for cash by a cashier (e.g. of a convenience store), by a gaming machine or by a specially configured CVT.

Figure 12:
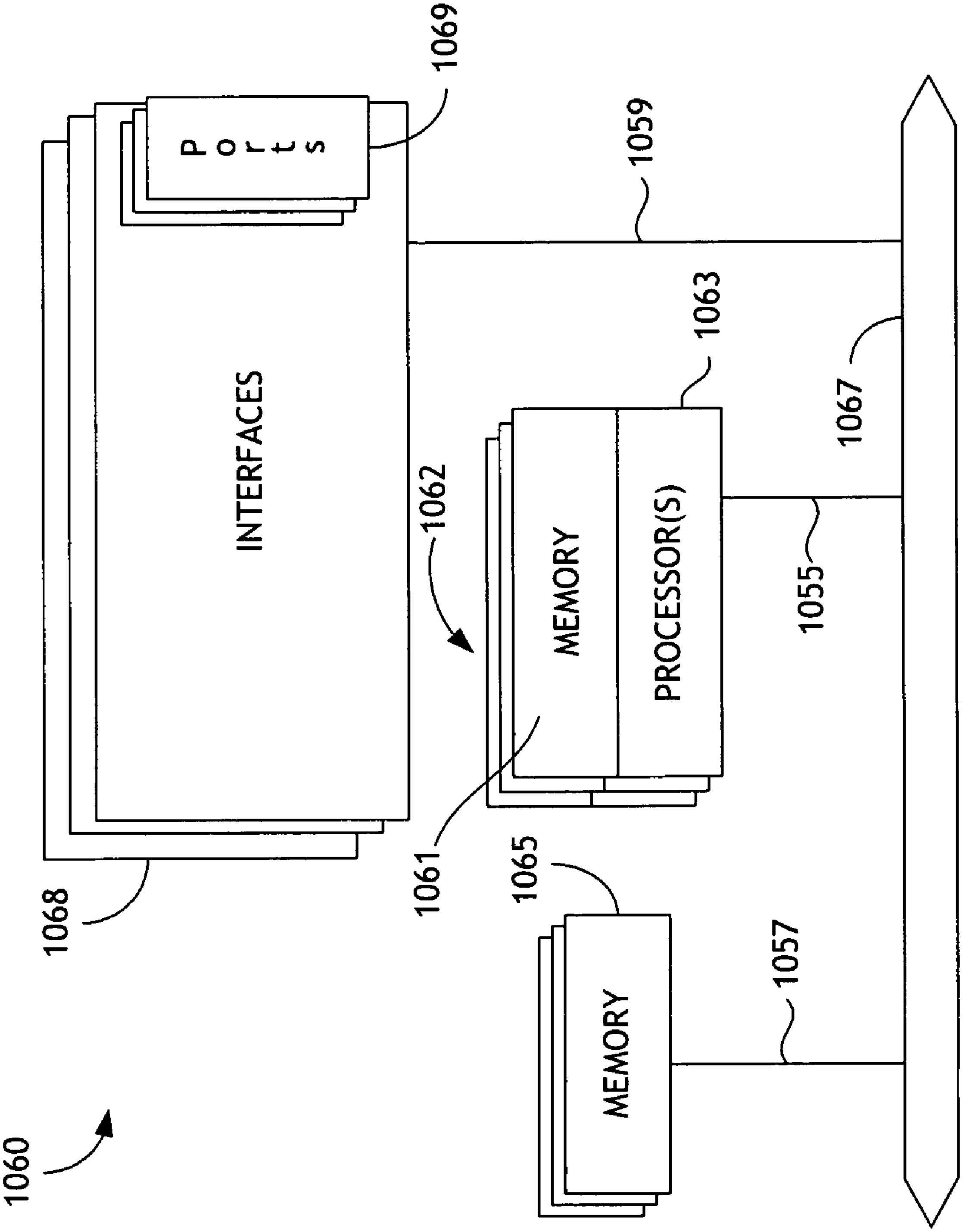
FIG. 12 is an illustration of a network device that may be configured for implementing some methods of the present invention.

FIG. 12 illustrates an example of a network device that may be configured for implementing some methods of the present invention. Network device 1060 includes a master central processing unit (CPU) 1062, interfaces 1068, and a bus 1067 (e.g., a PCI bus). Generally, interfaces 1068 include ports 1069 appropriate for communication with the appropriate media. In some embodiments, one or more of interfaces 1068 includes at least one independent processor and, in some instances, volatile RAM. The independent processors may be, for example, ASICs or any other appropriate processors. Accordingly, these independent processors perform at least some of the functions of the logic described herein. In other embodiments, one or more of interfaces 1068 control such communications-intensive tasks as encryption, decryption, compression, decompression, packetization, media control and management. By providing separate processors for the communications-intensive tasks, interfaces 1068 allow the master microprocessor 1062 efficiently to perform other functions such as routing computations, network diagnostics, security functions, etc.

The interfaces 1068 are typically provided as interface cards (sometimes referred to as "linecards"). Generally, interfaces 1068 control the sending and receiving of data packets over the network and sometimes support other peripherals used with the network device 1060. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 1062 may be responsible for implementing specific functions associated with the functions of a desired network device. According to some embodiments, CPU 1062 accomplishes all these functions under the control of software including an operating system and any appropriate applications software.

CPU 1062 may include one or more processors 1063 such as a processor from the Motorola family of microprocessors or the MIPS family of microprocessors. In an alternative embodiment, processor 1063 is specially designed hardware for controlling the operations of network device 1060. In a specific embodiment, a memory 1061 (such as non-volatile RAM and/or ROM) also forms part of CPU 1062. However, there are many different ways in which memory could be coupled to the system. Memory block 1061 may be used for a variety of purposes such as, for example, caching and/or storing data, programming instructions, etc.

Regardless of the network device's configuration, it may employ one or more memories or memory modules (such as, for example, memory block 1065) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

Although the system shown in FIG. 12 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces may be bus based (as shown in FIG. 12) or switch fabric based (such as a cross-bar).

The above-described devices and materials will be familiar to those of skill in the computer hardware and software arts. Although many of the components and processes are described above in the singular for convenience, it will be appreciated by one of skill in the art that multiple components and repeated processes can also be used to practice the techniques of the present invention.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are to be considered as illustrative and not restrictive, and the invention is not to be limited to the details given herein, but may be modified within the scope and equivalents of the appended claims.

We claim:

1. A method of managing the operation of mobile wager gaming devices in a wireless network, the method comprising:

transmitting a near-field magnetic ("NFM") security signal from an NFM transmitter;

receiving the NFM security signal at a mobile device having a mobile ID and capable of executing a wagering game;

maintaining operability of the mobile device upon the mobile device receiving the security signal; and disabling operability of the mobile device when the mobile device does not receive the security signal within a predetermined time period, such that operability of the mobile device is controlled based on a location of the mobile device.

2. The method of claim 1 further comprising:

transmitting gaming data from the mobile device to a gaming server using radio frequency ("RF") communication.

3. The method of claim 1 further comprising:

receiving gaming data at the mobile device from a gaming server using RF communication.

4. The method of claim 1 wherein the transmitting step further comprises assigning a unique signature to the NFM security signal, and wherein the unique signature corresponds to a specific mobile identifier of the mobile device.

5. The method of claim 4 further comprising:

receiving the NFM security signal with the unique signature at the mobile device with the specific mobile identifier wherein the specific mobile identifier corresponds to the unique signature, thereby providing interactivity between a specific mobile device and a gaming server.

6. The method of claim 5 further comprising:

exchanging gaming data between the mobile device and the gaming server using NFM communication.

7. The method of claim 5 further comprising:

creating a thread between the mobile device and the gaming server.

8. The method of claim 1 wherein the NFM security signal is broadcasted to a plurality of mobile devices.

9. The method of claim 1 wherein the NFM security signal is multicasted to a plurality of mobile devices.

10. The method of claim 1 wherein the transmitting step further comprises assigning a unique signature to the NFM security signal, and wherein the unique signature corresponds to a specific user.

11. The method of claim 10 further comprising:

associating the specific user to a specific mobile device.

12. The method of claim 11 wherein the specific user is associated with the specific mobile device when the specific user registers to use the specific mobile device.

13. The method of claim 1 further comprising:

associating the mobile device with a first zone in the wireless network, the first zone having a first set of NFM transmitters.

14. The method of claim 13 further comprising:

enabling a first set of gaming features on the mobile device when the mobile device is receiving NFM security signals in the first zone.

15. The method of claim 13 wherein the mobile device is operable for wager gaming only in the first zone.

16. The method of claim 13 wherein the mobile device is operable for non-gaming activities outside of the first zone.

17. The method of claim 13 wherein the mobile device is operable for providing non-wagering games outside of the first zone.

18. The method of claim 13 wherein the mobile device is not operable for any purpose outside the first zone.

19. The method of claim 13 wherein the mobile device contains an NFM signal receiver that is capable of detecting only a security signal from the first set of NFM transmitters.

20. The method of claim 13 further comprising:

determining whether the mobile device is in the first zone before transmitting gaming data to the mobile device.

21. The method of claim 1 wherein the mobile device receives non-gaming data using NFM communication.

22. The method of claim 1 further comprising:

registering a user for the mobile device thereby creating an authorized user for the device.

23. The method of claim 22 further comprising:

verifying that a user of the mobile device is the authorized user of the mobile device.

24. The method of claim 22 further comprising:

storing an authorized user identifier in the wireless network corresponding to the authorized user when the device is registered.

25. The method of claim 24 wherein the authorized user identifier is one of a fingerprint, a voice sample, an image, and a password.

26. The method of claim 22 further comprising:

performing a secondary identification of an authorized user.

27. The method of claim 26 wherein the mobile device includes an RFID device.

28. The method of claim 27 wherein the authorized user is identified using one of an RFID card, an RFID token, and an RFID bracelet.

29. The method of claim 22 wherein the mobile device contains a biometric mechanism.

30. The method of claim 29 further comprising:

ensuring that whenever the mobile device is in use, that the device is being used by the authorized user.

31. The method of claim 30 further comprising:

monitoring a physical touch of a hand on the mobile device.

32. The method of claim 31 further comprising:

re-authenticating the authorized user of the mobile device when the physical touch of a hand on the mobile device is not present.

33. The method of claim 32 wherein the mobile device includes a capacitive touch sensing device.

34. The method of claim 1 wherein the receiving step further comprises utilizing an NFM communication interface in the mobile device.

* * * * *